US012705100B1

(12) United States Patent
Zheng et al.

(10) Patent No.: US 12,705,100 B1
(45) Date of Patent: Aug. 11, 2026

(54) SHARED MEMORY PARALLEL EXECUTION OF NEURAL NETWORKS

(71) Applicant: Amazon Technologies, Inc., Seattle, WA (US)

(72) Inventors: Hongbin Zheng, San Jose, CA (US); Ilya Minkin, Los Altos, CA (US); Mohammad El-Shabani, Redwood City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 509 days.

(21) Appl. No.: 18/475,924

(22) Filed: Sep. 27, 2023

(51) Int. Cl.
*G06F 9/46* (2006.01)
*G06F 9/50* (2006.01)

(52) U.S. Cl.
CPC .......... *G06F 9/5016* (2013.01); *G06F 9/5033* (2013.01); *G06F 9/5072* (2013.01)

(58) Field of Classification Search
None
See application file for complete search history.

(56) References Cited

U.S. PATENT DOCUMENTS 10,643,299 B2 * 5/2020 Wang .................... G06F 9/3885
2021/0133583 A1 * 5/2021 Chetlur .................. G06N 3/084

FOREIGN PATENT DOCUMENTS

CN 112464784 A * 3/2021 ............. G06F 18/24
CN 115146757 A * 10/2022 ............. G06N 3/084

OTHER PUBLICATIONS

Jiang et al., OSDP: Optimal Sharded Data Parallel for Distributed Deep Learning; arXiv, May 19, 2023 (Year: 2023).*
Lim et al, Accelerating Training of DNN in Distributed Machine Learning System with Shared Memory; IEEE, 2017 (Year: 2023).*

* cited by examiner

*Primary Examiner* — Bing Zhao
(74) *Attorney, Agent, or Firm* — Weaver Austin Villeneuve & Sampson LLP

(57) ABSTRACT

Techniques to improve memory utilization for performing a collective compute operation may include allocating an amount of space in a shared memory of a processing node that is part of an integrated circuit device having multiple processing nodes. A number of sharded portions of parameters are obtained and stored in the shared memory. Each of the sharded portions of parameters stored in the shared memory is multicasted to a state buffer of other processing nodes in the integrated circuit device to provide each state buffer with the number of sharded portions of parameters for the collective compute operation.

20 Claims, 15 Drawing Sheets

500

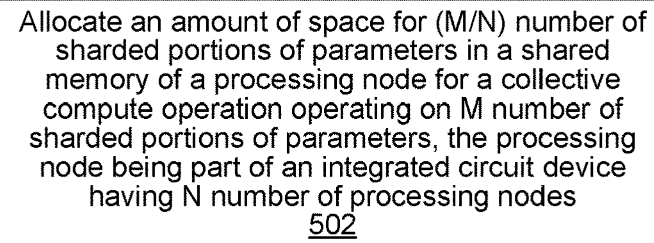

Store a sharded portion of parameters associated with the processing node in the allocated space of the shared memory of the processing node
504

Obtain (M/N)–1 number of sharded portions of parameters from other integrated circuit devices to store (M/N) number of sharded portions of parameters in the allocated space of the shared memory of the processing node
506

Multicast each of the (M/N) sharded portions of parameters to a state buffer of each of the N number of processing nodes in the integrated circuit device to provide each state buffer with M number of sharded portions of parameters for the collective compute operation
508

FIG. 5

SHARED MEMORY PARALLEL EXECUTION OF NEURAL NETWORKS

BACKGROUND

Neural networks can be used to perform tasks such as recognizing an object in an image. In a neural network, input data is combined with weights to derive output data using activation functions. The set of weights used in a neural network can be determined by a training process, in which the neural network can learn how to perform a certain computing task for an application. The weights of the neural network can be adjusted to minimize the differences between the training output data and reference output data.

BRIEF DESCRIPTION OF THE DRAWINGS

Various embodiments in accordance with the present disclosure will be described with reference to the drawings, in which:

FIG. 5 illustrates a flow diagram of an example of a process for performing a collective compute operation using shared memory when executing a neural network model;

DETAILED DESCRIPTION

Figure 1:
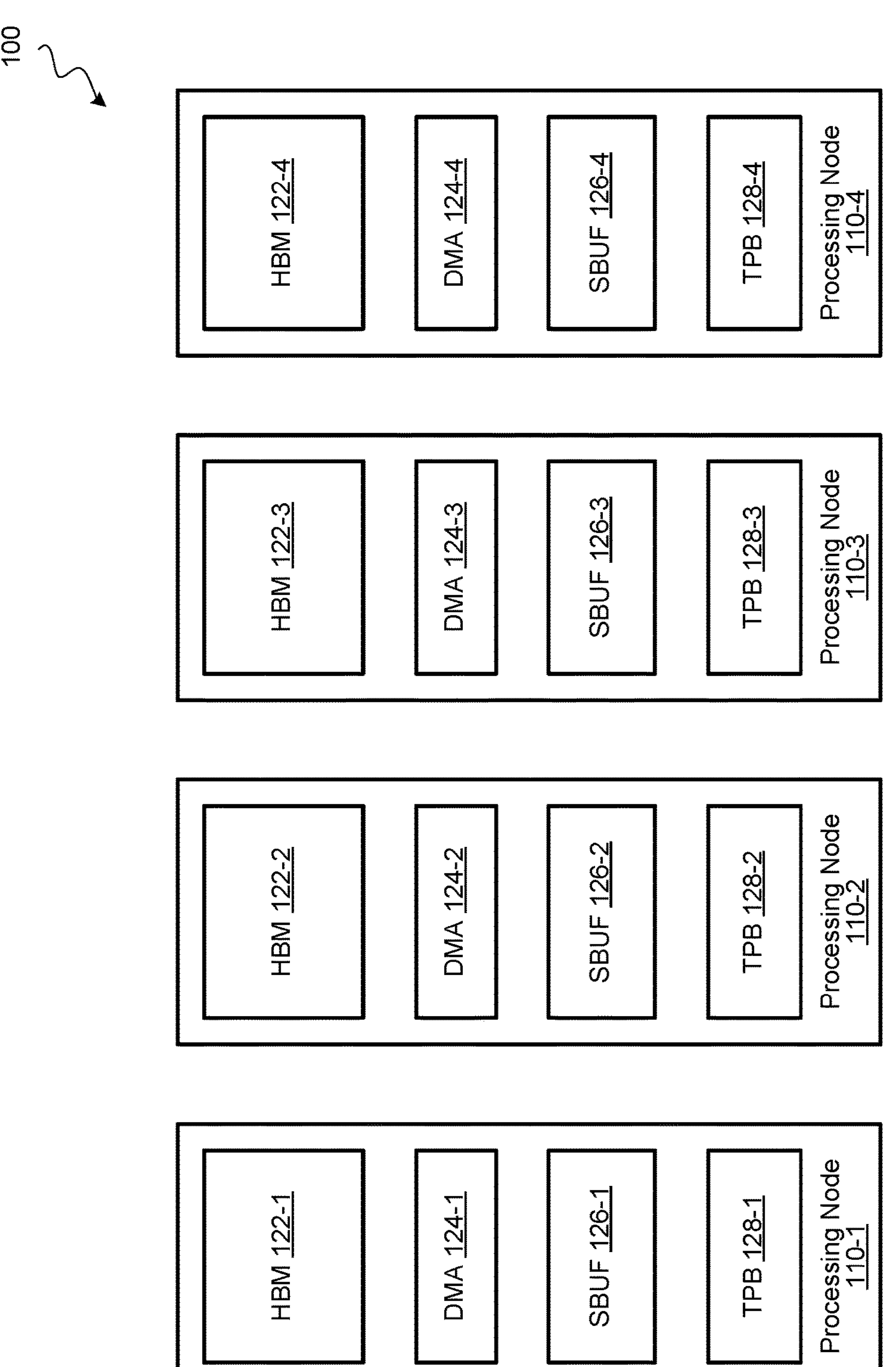
FIG. 1 illustrates an example of a system of processing nodes.

One way to accelerate training and/or inference, especially for deep learning neural networks, is to use a distributed system in which the training and/or inference computations of the neural network are distributed across multiple processing nodes. Model parallel execution partitions the model parameters, and distributes portions of the model amongst the processing nodes. Each processing node can be responsible for executing a subset of layers of the model. During execution, activations of an input data batch are moved between processing nodes as the execution progresses through the layers of the neural network model. Data parallel execution partitions the input data batch into minibatches, and distributes the minibatches of input data amongst the processing nodes. Although each processing node is only responsible for processing a portion of the input data set, the full set of model parameters is maintained in each processing node for data parallel execution.

Fully sharded data parallel execution combines the model parallel and data parallel execution modes to allow each processing node to maintain only a sharded portion of the model parameters while processing a minibatch of input data. During execution, the sharded model parameters from other processing nodes are moved into the local processing node to provide the local processing node with the model parameters to process the minibatch of input data. As execution progresses through the layers of the neural network model, the model parameters obtained from other processing nodes for a completed layer can be swapped out at the local processing node with model parameters obtained from other processing nodes for the next layer.

Generally, distributed computations on large neural network models are performed using collective compute operations (e.g., all-reduce, all-gather, reduce-scatter, etc.) to distribute and/or gather parameters amongst the processing nodes. For example, in fully sharded data parallel execution, an all-gather operation can be performed to provide a local processing node with the model parameters (e.g., weight values, reduced gradients, etc.) from other processing nodes. Each processing node can have its own main memory in which the model parameters for the current layer gathered from the other processing nodes are stored. The model parameters can then be transferred from the main memory to a buffer (e.g., state buffer) of the processing node for loading into a tensor processing block that performs the computations. Although the fully sharded data parallel execution reduces the memory footprint of the model parameters maintained at each processing node, this comes at the extra cost of additional memory accesses during execution to move the model parameters into and out of the main memory of each processing node.

To reduce the amount of memory accesses made to the main memory of a processing node when executing collective compute operations, the techniques disclosed herein can implement a shared memory parallel execution approach in which multiple processing nodes share accesses to their main memories with each other. For example, an integrated circuit device such as an acceleration engine may include N number of processing nodes bundled on the same device. By sharing the main memories of the respective processing nodes with each other on the same device, the amount of model parameters that each processing node has to gather in the corresponding main memory can be reduced by a factor of N. Consequently, the number of memory accesses to load the model parameters from the shared main memories to the buffer of each tensor processing block can also be reduced by a factor of N. In some implementations, management of the shared memory and the data movement for the collective compute operation can be performed by a runtime driver of the system. As such, the reduction in main memory usage and memory accesses can be achieved without extensive modification to the compiled executable code.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates an example of a distributed system 100 to accelerate execution of a neural network model. Distributed system 100 may include processing nodes 110-1 to 110-4. Processing node 110-1 may include a main memory 122-1 (e.g., implemented using high-bandwidth memory (HBM)), a set of direct memory access (DMA) engines 124-1, a state buffer (SBUF) 126-1, and a tensor processing block (TPB) 128-1 (e.g., a systolic array). Processing node 110-1 may also include other components not specifically shown, such as other compute engines (e.g., activation engine, vector compute engine, and/or pooling engine), and other buffer memories (e.g., partial sum buffer), etc. Each of processing nodes 110-2 to 110-4 may include a similar set of components. For example, processing node 110-2 may include HBM 122-2, DMA 124-2, SBUF 126-2, and TPB 128-2; processing node 110-3 may include HBM 122-3, DMA 124-3, SBUF 126-3, and TPB 128-3; and processing node 110-4 may include HBM 122-4, DMA 124-4, SBUF 126-4, and TPB 128-4. Processing nodes 110-1 to 110-4 can be part of a host system (not shown), and each processing node can be coupled to the host system using an interconnect bus such as peripheral component interconnect express (PCIe) bus.

TPB 128-1 can be implemented, for example, using a systolic array or other types of integrated circuit for accelerating neural network computations (e.g., matrix multiplication computations) such as a graphics processing unit (GPU) core, etc. In some implementations, TPB 128-1 may include an array of processing elements (PE array) in which each processing element contains a multiply-and-add circuit. A stationary matrix such as a weight matrix can be preloaded in the PE array, and a transitory matrix such as a feature map matrix representing input data or intermediate results can be shifted into the PE array to perform a matrix multiplication that multiplies the stationary matrix with the transitory matrix.

Main memory 122-1 acts as the main memory of processing node 110-1, and may provide a larger storage capacity than state buffer 126-1. Main memory 122-1 can be used to store model parameters, input data, intermediate data, and/or output data used by processing node 110-1. When the host system exchanges data with processing node 110-1, main memory 122-1 can be used as the intermediary storage between the host system and TPB 128-1. For example, the host system may write input data and model parameters into main memory 122-2 for TPB 128-1 to process, and the output data generated by TPB 128-1 can be written back to main memory 122-1 for the host system to access. Main memory 122-1 can be implemented, for example, using HBM. Although the main memory of each processing node may be referred to as HBM in the figures and the description below, it should be understood that the main memory can be implemented using other types of memory.

The set of DMA engines 124-1 (or simply referred to as DMA) can be used to transfer data amongst the components of processing node 110-1 without involving the host processor of the host system. To facilitate the data transfers, each of the DMA engines in DMA 124-1 may include read and write queues. The read queues can be configured with memory descriptors indicating source locations of the data being transfer, and the write queues can be configured with memory descriptors indicating target locations of where the data is to be stored. The memory descriptors can be generated, for example, by a runtime driver.

State buffer 126-1 acts as a cache memory for TPB 128-1. Input data and model parameters stored in main memory 122-1 by the host system can be moved into state buffer 126-1 (e.g., by DMA 124-1) in preparation for loading into TPB 128-1. To perform matrix multiplication of tensors having larger dimensions than the array size of TPB 128-1, the tensors can be decomposed into a series of submatrices. The submatrices stored in state buffer 126-1 can be shifted into TPB 128-1 to perform the matrix multiplication operation. Intermediate results can be stored back in state buffer 126-1, and be loaded into TPB 128-1 for subsequent computations that operate on the intermediate results. The final results of the matrix multiplication operation can be written back to main memory 122-1 for the host system to access.

FIGS. 2A to 2D illustrate an example of implementing fully sharded data parallel execution in distributed system 100. As discussed above, distributed system 100 may include four processing nodes 110-1 to 110-4. As such, the host system may partition the model parameters of the neural network model into four sharded portions such that each of processing nodes 110-1 to 110-4 is responsible for maintaining just a portion of the model parameters. The host system may also partition an input data batch into four minibatches of input data such that each of processing nodes 110-1 to 110-4 is responsible for processing just a minibatch of input data. In this manner, execution of the neural network model can be accelerated because the workload is distributed to the four processing nodes 110-1 to 110-4 for parallel processing.

More generally, to perform fully sharded data parallel execution in a system having M number of processing nodes (M being an integer greater than 1), the model parameters can be partitioned into M number of sharded portion of model parameters such that each processing node is responsible for maintaining one of the sharded portions. Similarly, the input data batch can be partitioned into M number of minibatches of input data such that each processing node is responsible for processing one of the minibatches of input data. The example shown in FIGS. 2A-2D has M=4 because the distributed system 100 has four processing nodes to share the workload of executing the neural network model.

Figure 2A:
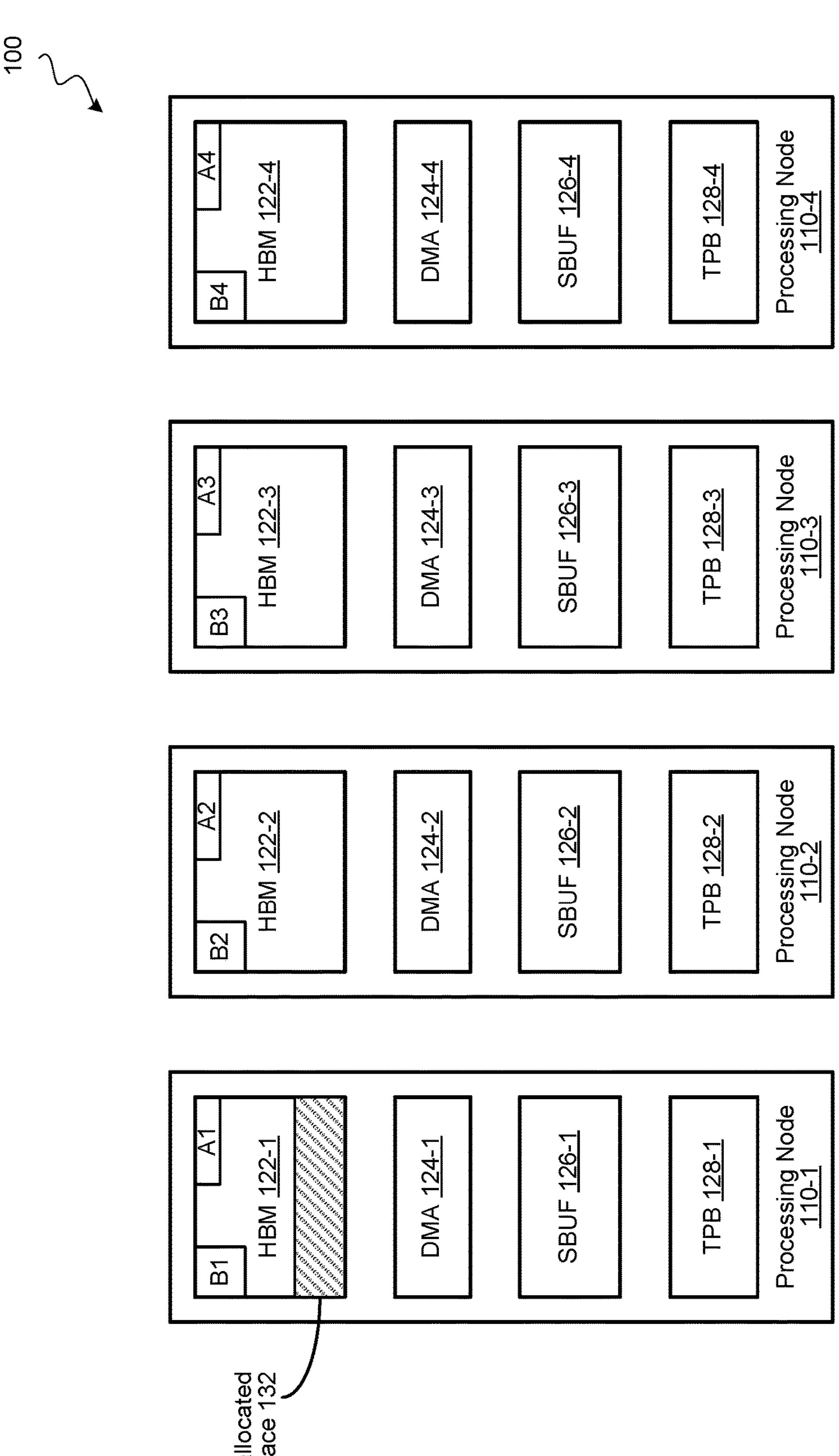
FIG. 2A illustrates a first part of an example of implementing fully sharded data parallel execution in a system of processing nodes.

Referring to FIG. 2A, the model parameters (e.g., weigh values) for a layer of the neural network model can be partitioned into four sharded portions B1, B2, B3, and B4. The host system may store sharded portion B1 in HBM 122-1 of processing node 110-1, sharded portion B2 in HBM 122-2 of processing node 110-2, sharded portion B3 in HBM 122-3 of processing node 110-3, and sharded portion B4 in HBM 122-4 of processing node 110-4. Similarly, an input data batch can be partitioned into four minibatches of input data A1, A2, A3, and A4. The host system may store minibatch A1 in HBM 122-1 of processing node 110-1, minibatch A2 in HBM 122-2 of processing node 110-2, minibatch A3 in HBM 122-3 of processing node 110-3, and minibatch A4 in HBM 122-4 of processing node 110-4. Hence, each processing node maintains a sharded portion of the model parameters and is responsible for processing a minibatch of input data.

For ease of illustration, the fully sharded data parallel execution of the neural network layer occurring in processing node 110-1 will be shown and described. It should be understood that similar operations can be performed concurrently by the other processing nodes 110-2 to 110-3 to implement parallel processing of their respective minibatches of input data. In preparation of executing a layer of the neural network model, processing node 110-1 may allocate sufficient space in HBM 122-1 to accommodate the model parameters B1, B2, B3, and B4 corresponding to the neural network layer being executed. This is shown as allocated space 132 with the diagonal fill pattern in HBM 122-1. Allocated space 132 can act as a staging area for the model parameters before they are loaded into the state buffer 126-1. In some implementations, the space already occupied by the sharded portion B1 being maintained in processing node 110-1 can be considered part of allocated space 132, because this sharded portion of the model parameters is already resident in HBM 122-1. Although not shown in FIG. 2A, the other processing nodes 110-2 to 100-3 may allocate a similar amount of space in their respective HBMs 122-2 to 122-3.

Figure 2B:
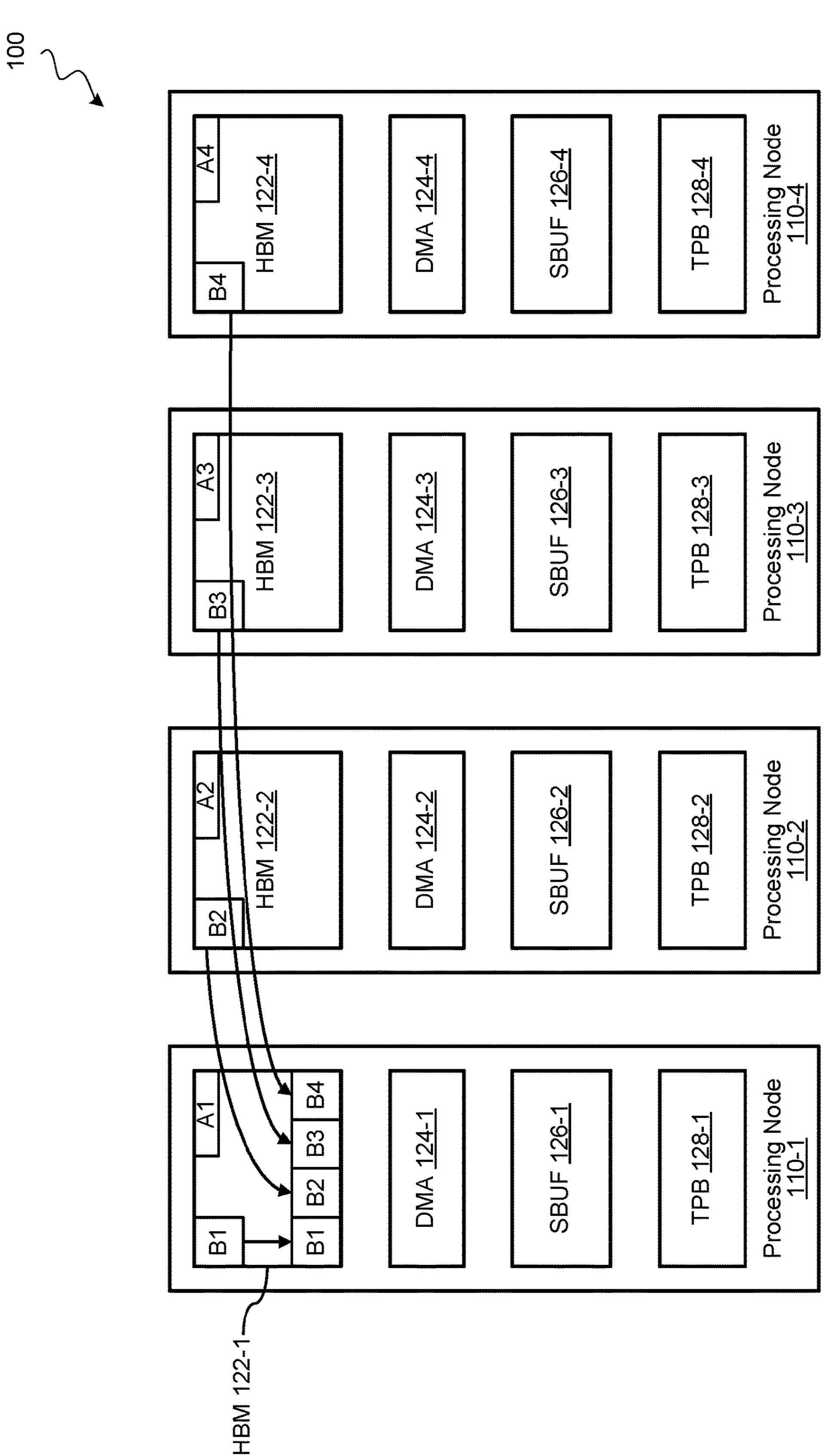
FIG. 2B illustrates a second part of an example of implementing fully sharded data parallel execution in a system of processing nodes.

Referring to FIG. 2B, the sharded portions of model parameters B2, B3, and B4 corresponding to the neural network layer maintained by the other processing nodes 110-2 to 110-4 are copied into the allocated space 132 of HBM 122-1 by executing a collective compute operation such as an all-gather operation. The sharded portions of model parameters from the other processing nodes can be copied into the local processing node, for example, over PCIe. If the allocated space 132 includes additional space for the locally maintained sharded portion B1, the sharded portion B1 can also copied from its resident location in HBM 122-1 into the allocated space 132. Similar operations can be performed in the other processing nodes 110-2 to 110-4 such that the HBM of each of the processing nodes is provided with the full set of model parameters B1, B2, B3, and B4 corresponding to the neural network layer.

Figure 2C:
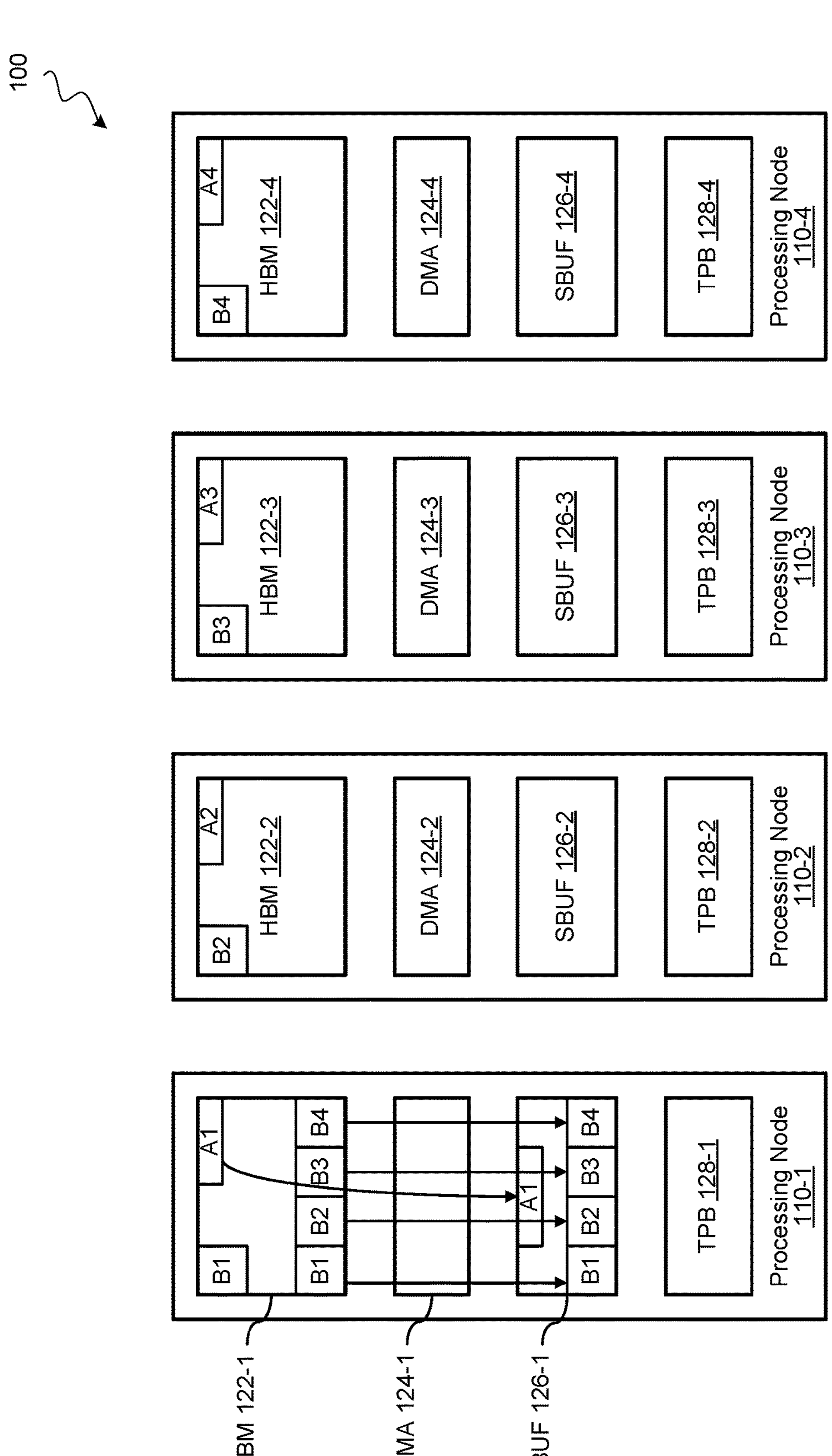
FIG. 2C illustrates a third part of an example of implementing fully sharded data parallel execution in a system of processing nodes.

Referring to FIG. 2C, upon obtaining the full set of model parameters B1, B2, B3, and B4 in HBM 122-1, DMA 124-1 can transfer the model parameters from HBM 122-1 into state buffer 126-1 using DMA operations. The DMA operations can be performed without involving the host processor of the host system. A runtime driver can prepare the memory descriptors used by DMA 124-1 to carry out the data transfer. The minibatch of input data A1 that processing node 110-1 is responsible for processing can also be moved into state buffer 126-1 using DMA operations. Similar DMA operations can be performed in each of the other processing nodes 110-2 to 110-4 to transfer the full set of model parameters B1, B2, B3, and B4 for the neural network layer and the corresponding minibatch of input data from the HBM into the state buffer of the respective processing node.

Figure 2D:
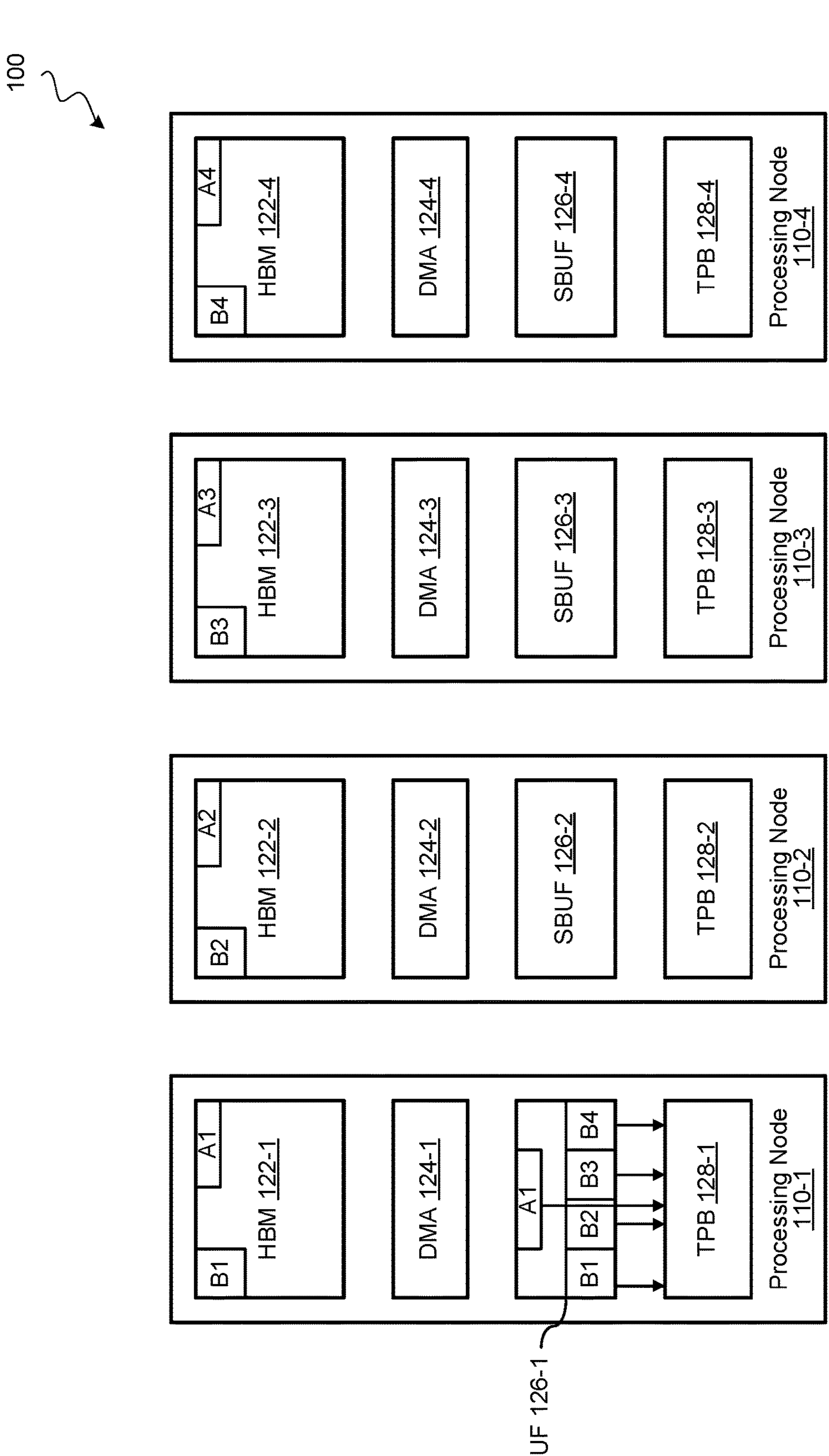
FIG. 2D illustrates a fourth part of an example of implementing fully sharded data parallel execution in a system of processing nodes.

Referring to FIG. 2D, the full set of model parameters B1, B2, B3, and B4 for the neural network layer and the corresponding minibatch of input data A1 can be loaded from state buffer 126-1 into the TPB 128-1 for processing. By way of example, the model parameters B1, B2, B3, and B4 can be a weight matrix, and the minibatch of input data A1 can be a feature map matrix. In some implementations, the weight matrix (model parameters B1, B2, B3, and B4) can be preloaded into TPB 128-1 from state buffer 126-1, and the feature map matrix (minibatch A1) can be streamed into TPB 128-1 to perform a matrix multiplication operation on the two matrices. The results can be written back to the state buffer 126-1, and subsequently to HBM 122-1 for access by the host system. Each of the other processing nodes 110-2 to 110-4 can process their respective minibatches A2 to A4 in a similar manner in parallel.

Each layer of the neural network model can be executed by repeating similar operations as those described above with reference to FIGS. 2A-2D. In some implementations, after the set of model parameters for a given layer (e.g., sharded portions B1, B2, B3, and B4) have be loaded from HBM 122-1 into state buffer 126-1, the set of model parameters obtained from the other processing nodes can be removed from the allocated space in HBM 122-1 to make room for the model parameters of the next layer. It should be noted that each processing node still retains the sharded portion that the particular processing node is responsible for in its main memory.

As illustrated by the FIGS. 2A-2D, the memory footprint of the space allocated in the main memory (e.g., HBM) of each processing node to accommodate the model parameters can be M times that of the size of the sharded portion of the model parameters maintained by the local processing node. The amount of memory accesses made to the main memory to move the model parameters from the main memory into the state buffer, and hence the memory bandwidth of the main memory utilized for transferring the model parameters, also scales by M.

Figure 3:
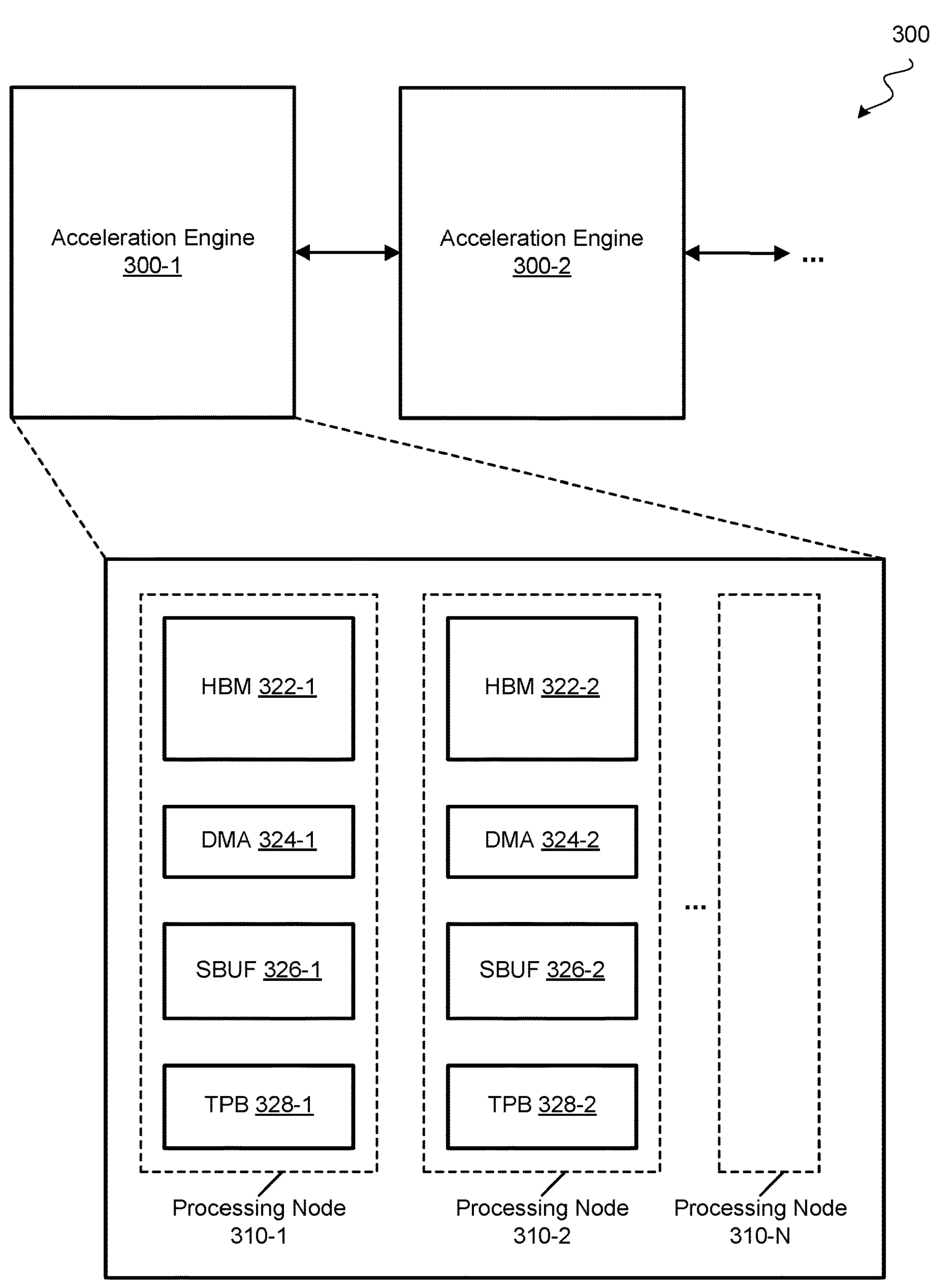
FIG. 3 illustrates an example of a system of processing nodes with shared memory.

FIG. 3 illustrates an example of a system 300 that can improve the memory footprint and bandwidth utilization of the main memory of each processing node when executing a collective compute operation such as an all-gather operation. System 300 may include M number of processing nodes implemented using integrated circuit devices that each provides N-way shared main memories. For example, system 300 may include acceleration engines 300-1, 300-2, etc., and each acceleration engine may contain N number of processing nodes that provide shared accesses to their main memories within the acceleration engine. Hence, system 300 may include (M/N) number of acceleration engines to provide a total of M number of processing nodes.

Acceleration engine 300-1 is an example of an integrated circuit device having N-way shared main memories. Acceleration engine 300-1 may include N number of processing nodes such as processing nodes 310-1, 310-2, . . . 310-N. Processing node 310-1 may include a shared memory implemented as HBM 322-1 that is accessible by each of processing nodes 310-1 to 310-N of acceleration engine 300-1. Processing node 310-1 may also include a set of DMA engines 324-1. DMA 324-1 can read and write data from and to any of the components of acceleration engine 300-1 Hence, DMA 324-1 can read data from the components of processing node 310-1, and write the data into the components of processing node 310-1 or to any of the other processing nodes 310-2 to 310-N. DMA 324-1 can also read data from the other processing nodes 310-2 to 310-N, and write the data into the components of processing node 310-1. DMA 324-1 can also multicast data by reading the data once from a source location in acceleration engine 300-1, and writing the data to multiple target locations in acceleration engine 300-1. Processing node 310-1 may also include a state buffer 326-1 and a tensor processing block 328-1. These components are similar to those described above with reference to FIG. 1.

The other processing nodes 310-2 to 310-N may include a similar set of components as processing node 310-1. For example, processing node 310-2 may include a shared memory implemented as HBM 322-2, a set of DMA engines 324-2, a state buffer 326-2, and a tensor processing block 328-2. Notably, the main memory of each processing node is shared amongst the processing nodes within acceleration engine 300-1. This allows the DMA of any of the processing node to access data from a corresponding HBM, and write the data into the state buffer of any of the processing nodes within the acceleration engine. Coupling this capability with the multicast capability of the DMA engines, data can be read once from the HBM and be written to multiple state buffers within the acceleration engine to implement shared memory parallel execution. By utilizing shared memory parallel execution, the memory footprint of the space allocated in the main memory of each processing to store model parameters for the current layer of the neural network can be reduced. Consequently, the memory bandwidth consumed to transfer the model parameters from the main memory into the corresponding state buffer of each processing node can also be reduced.

FIGS. 4A-4D illustrate an example of implementing fully sharded data parallel execution in system 400. System 400 can be similar to system 300, and provides shared memory parallel execution for the processing nodes to reduce the memory footprint and memory bandwidth utilized for transferring model parameters. For ease of illustration, the example in FIGS. 4A-4D implements the fully sharded data parallel execution with M=4 processing nodes such that the model parameters and the input data batch are each partitioned into four portions. In the example shown, each acceleration engine may include N=2 number of processing nodes used for executing the neural network model. Hence, system 400 may include (M/N)=2 number of acceleration engines each having N=2 number of processing nodes to provide 4-way fully sharded data parallel execution.

Figure 4A:
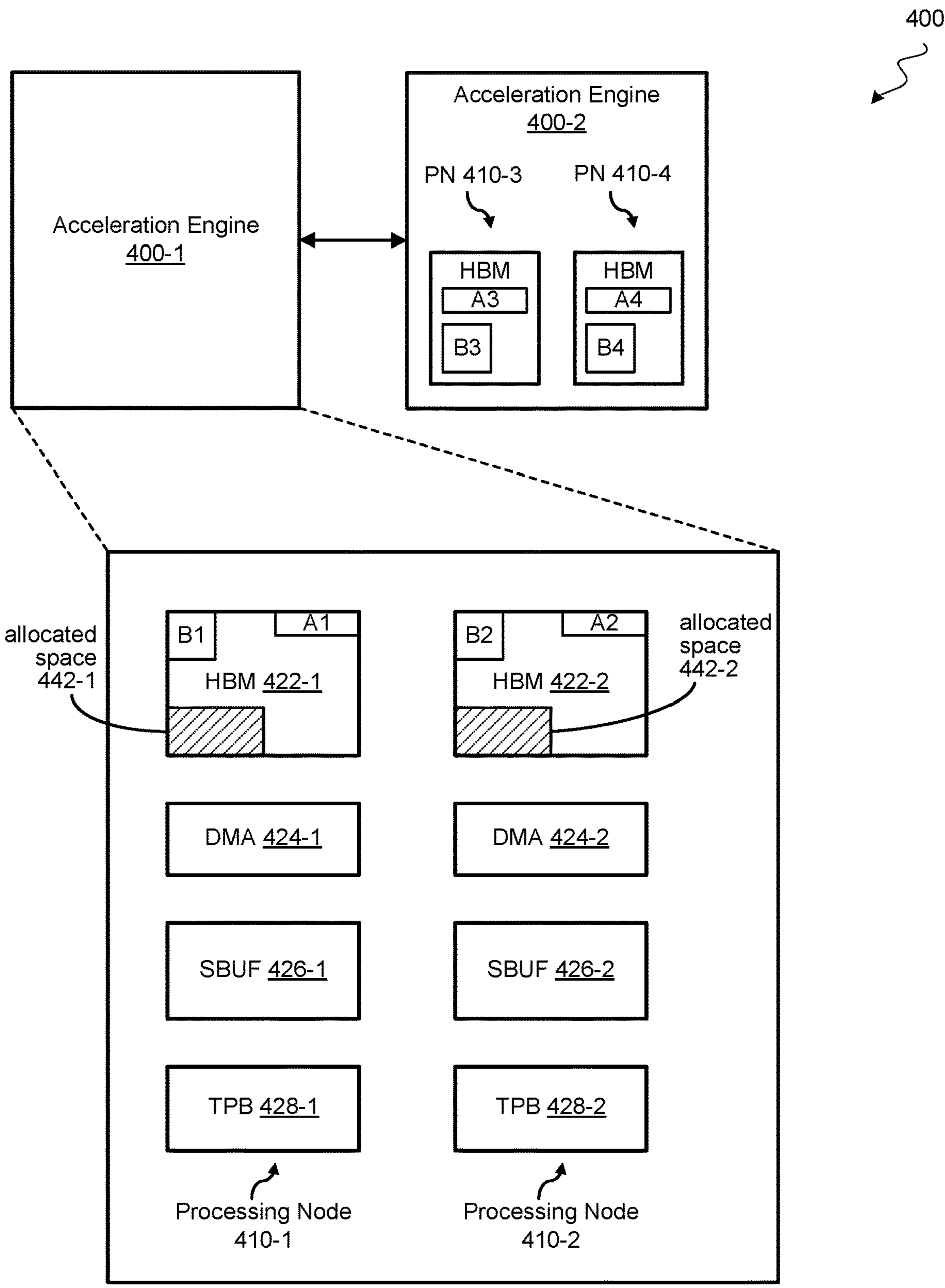
FIG. 4A illustrates a first part of an example of implementing fully sharded data parallel execution in a system of processing nodes with shared memory.

Referring to FIG. 4A, system 400 may include acceleration engines 400-1 and 400-2 coupled to a host system (not shown). Acceleration engine 400-1 may include two processing nodes 410-1 and 410-2. Processing node 410-1 may include a main memory implemented using HBM 422-1, DMA 424-1, state buffer 426-1, and tensor processing block 428-1. Processing node 410-2 may include a similar set of components including HBM 422-2, DMA 424-2, state buffer 426-2, and tensor processing block 428-2. These components are similar to those discussed above with reference to system 300. Acceleration engine 400-2 may also include two processing nodes (PN) 410-3 and 410-4. Although only the HBM of these processing nodes are shown, each of processing nodes 410-3 and 410-4 contains a similar set of components as processing node 410-1.

The model parameters (e.g., weight values) for a layer of the neural network model can be partitioned into four sharded portions B1, B2, B3, and B4. The host system may store sharded portion B1 in HBM 422-1 of processing node 410-1, sharded portion B2 in HBM 422-2 of processing node 410-2, sharded portion B3 in HBM 422-3 of processing node 410-3, and sharded portion B4 in HBM 422-4 of processing node 410-4. Similarly, an input data batch can be partitioned into four minibatches of input data A1, A2, A3, and A4. The host system may store minibatch A1 in HBM 422-1 of processing node 410-1, minibatch A2 in HBM 422-2 of processing node 410-2, minibatch A3 in HBM 422-3 of processing node 410-3, and minibatch A4 in HBM 422-4 of processing node 410-4. Hence, each processing node maintains a sharded portion of the model parameters and is responsible for processing a minibatch of input data.

In preparation of executing the layer of the neural network model, system 400 may execute a collective compute operation such as an all-gather operation to provide each of the processing nodes with the model parameters maintained by the other processing nodes. Processing node 410-1 may allocate sufficient space in HBM 422-1 (shown as allocated space 442-1) to accommodate (1/N) of the model parameters corresponding to the neural network layer being executed, with N being the number of processing nodes in the acceleration engine 410-1 sharing access to their respective main memories. Given that there are M number of sharded portions of model parameters, the amount of memory in allocated space 442-1 can be (M/N) times that of a sharded portion.

As compared to the example shown in FIG. 2A, allocated space 442-1 has a memory footprint that is 1/N smaller than allocated space 132. The reduction in memory footprint is possible because processing nodes 410-1 and 410-2 share their main memories. Thus, so long as the full set of model parameters are stored in the shared main memories collectively, each processing node will have access to the full set of model parameters. Even though the main memories (HBMs 422-1 and 422-2) should still collectively allocate sufficient space for the full set of model parameters B1, B2, B3, and B4, the amount of space allocated in the main memory of each of the processing nodes can be reduced by a factor of N.

Similar to processing node 410-1, processing node 410-2 may also allocate space in HBM 422-2 (shown as allocated space 442-2) to accommodate (1/N) of the model parameters corresponding to the neural network layer being executed. With N=2, each of HBMs 422-1 and 422-2 can allocate space for half of the set of model parameters. Although not shown in FIG. 4A, processing nodes 410-3 and 410-4 can perform similar operations to allocate space in their respective HBMs 422-3 and 422-4 for (1/N) of the model parameters.

Figure 4B:
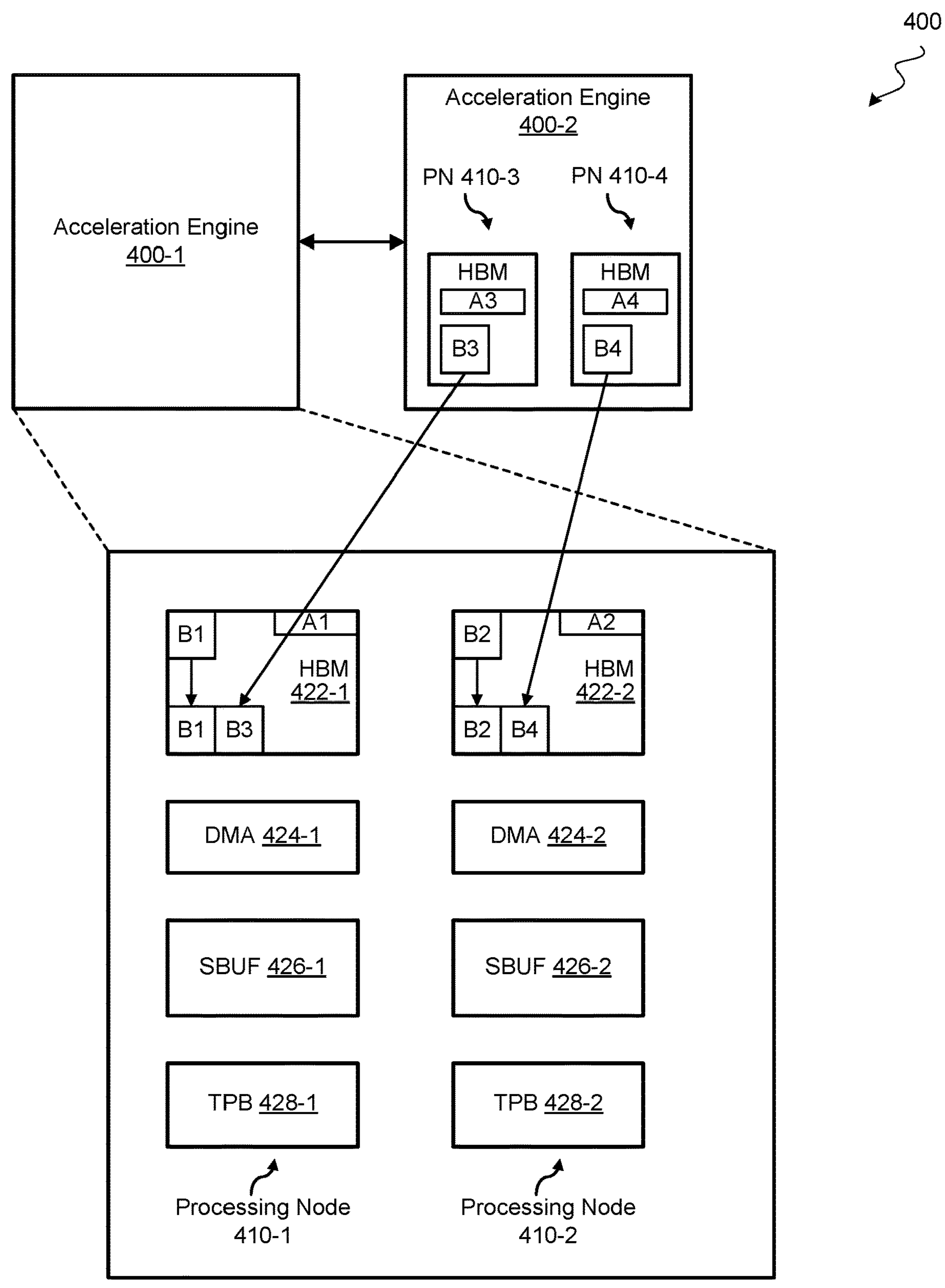
FIG. 4B illustrates a second part of an example of implementing fully sharded data parallel execution in a system of processing nodes with shared memory.

Next, referring to FIG. 4B, each of the N number of processing nodes within an acceleration engine obtains respective (1/N) of the model parameters such that the full set of model parameters for the layer of the neural network model is available within each acceleration engine. For example, the sharded portions of model parameters B3 and B4 maintained by the other acceleration engine 400-2 are copied into acceleration engine 400-1. Because HBM 422-1 and 422-2 are shared by processing nodes 410-1 and 410-2, each of the sharded portions maintained in acceleration engine 400-2 only needs to be copied into one of main memories of acceleration engine 400-1. As shown in FIG. 4B, sharded portion B3 is copied from processing node 410-3 into allocated space 442-1 of HBM 422-1, and sharded portion B4 is copied from processing node 410-4 into allocated space 442-1 of HBM 422-2.

The local sharded portion of model parameters resident in each HBM can also be copied into the allocated space. For example, sharded portion B1 maintained in HBM 422-1 can be copied into allocated space 442-1, and sharded portion B2 maintained in HBM 422-2 can be copied into allocated space 442-2. In some implementations, the space occupied by the local resident sharded portion can be considered as part of the space allocated for collecting the model parameters such that the local copying of the resident sharded portion of model parameters can be omitted.

Similar operations can be performed by processing nodes 410-3 and 410-4. For example, sharded portion B1 is copied from HBM 422-1 into processing node 410-3, and sharded portion B4 is copied from HBM 422-2 into processing node 410-4. The local sharded portion B3 maintained in HBM 422-3 can be copied into the allocated space of HBM 422-3, and the local sharded portion B4 maintained in HBM 422-4 can be copied into the allocated space of HBM 422-4. In some implementations, the local copying can be omitted as discussed above.

Figure 4C:
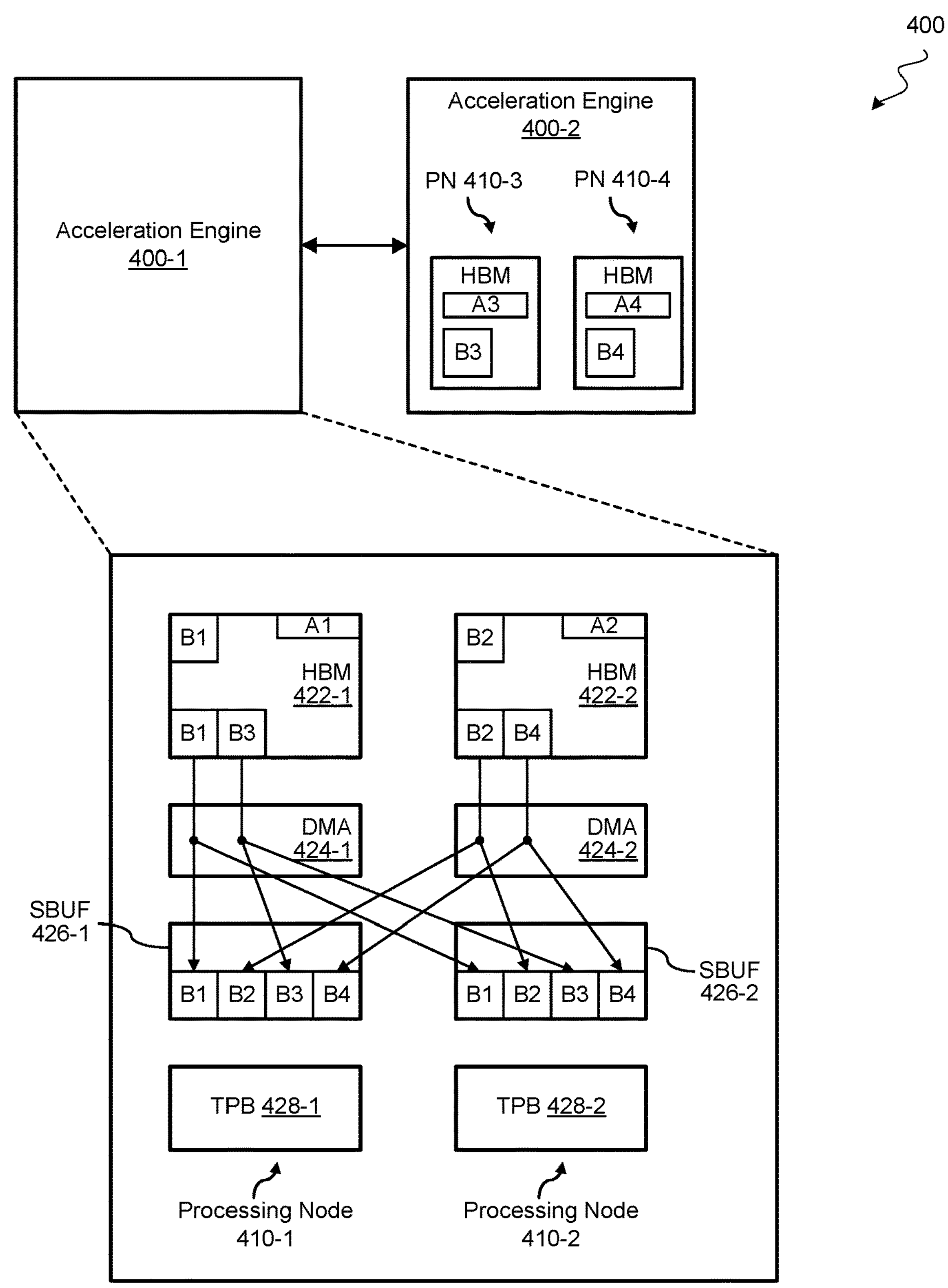
FIG. 4C illustrates a third part of an example of implementing fully sharded data parallel execution in a system of processing nodes with shared memory.

Referring to FIG. 4C, the model parameters collected at each acceleration engine are moved into the state buffer of each processing node. For example, the DMA engines of each processing node can multicast the model parameters gathered in the corresponding HBM of the processing node to its own state buffer and to the other state buffers in the acceleration engine. For example, DMA 424-1 may read the sharded portions B1 and B3 once from HBM 422-1, and multicast the sharded portions B1 and B3 to state buffers 426-1 and 426-2. DMA 424-2 may read the sharded portions B2 and B4 once from HBM 422-2, and multicast the sharded portions B2 and B4 to state buffers 426-1 and 426-2. Although not shown, acceleration engine 400-2 may perform similar operations to provide the state buffer of each of the processing nodes 410-3 and 410-4 with the full set of model parameters B1, B2, B3, and B4 for the layer of the neural network being executed. Because each sharded portion only needs to be read once from the HBM for writing into multiple state buffers, the number of memory accesses made to each HBM can also be reduced by a factor of N, because only (1/N) amount of model parameters is stored in each HBM.

Figure 4D:
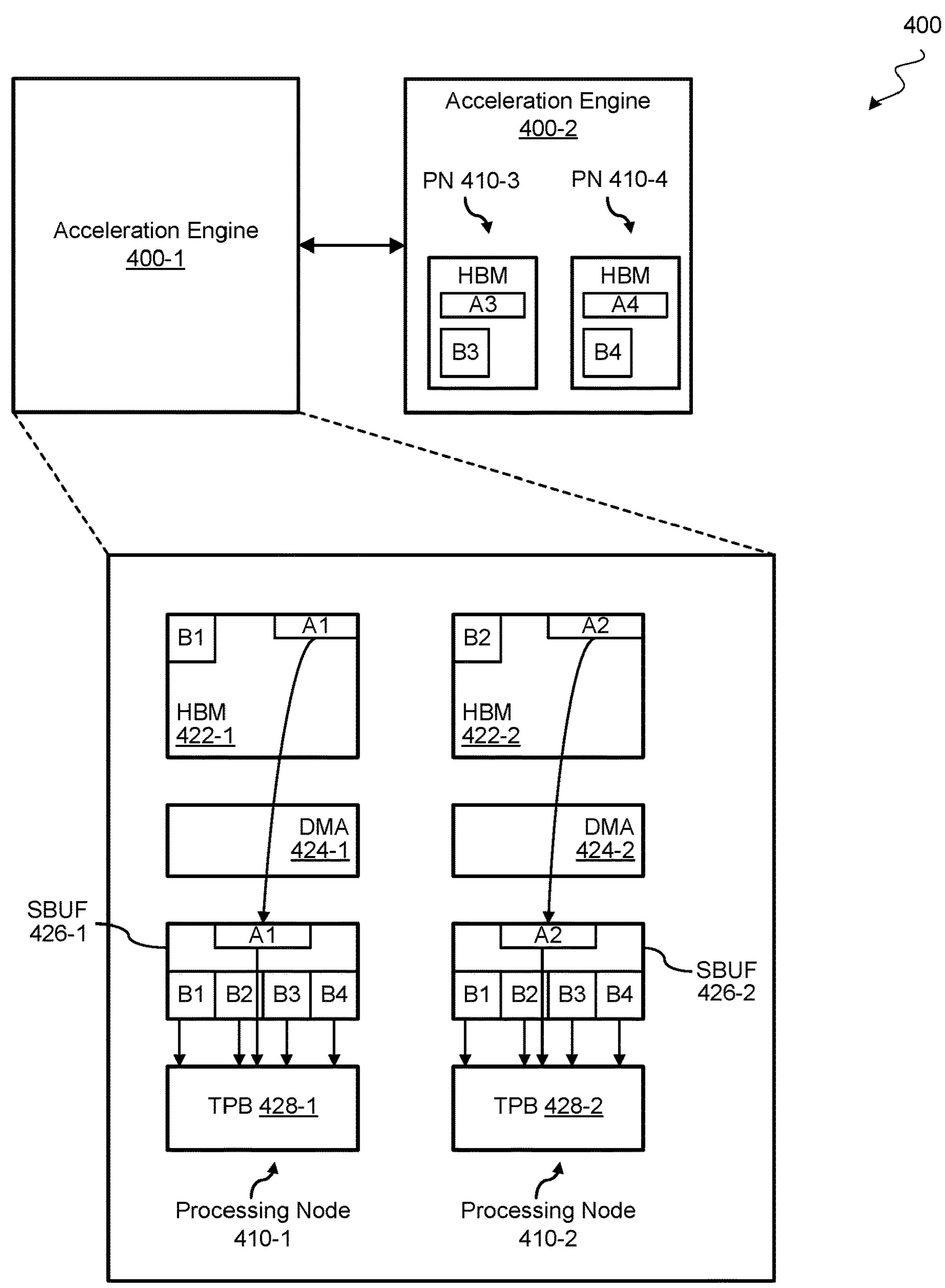
FIG. 4D illustrates a fourth part of an example of implementing fully sharded data parallel execution in a system of processing nodes with shared memory.

Referring to FIG. 4D, DMA operations are also used to move minibatch A1 from HBM 422-1 into state buffer 426-1, and minibatch A2 from HBM 422-2 into state buffer 426-2. The full set of model parameters B1, B2, B3, and B4 for the neural network layer and the corresponding minibatch of input data A1 can be loaded from state buffer 426-1 into the TPB 428-1 for processing. Similarly, the full set of model parameters B1, B2, B3, and B4 for the neural network layer and the corresponding minibatch of input data A2 can be loaded from state buffer 426-2 into the TPB 428-2 for processing. Each of the other processing nodes 410-3 and 410-4 can process their respective minibatches A3 and A4 in a similar manner in parallel.

Each layer of the neural network model can be executed by repeating similar operations as those described above with reference to FIGS. 4A-4D. In some implementations, after the set of model parameters for a given layer (e.g., sharded portions B1, B2, B3, and B4) have be loaded from the main memory into a state buffer, the set of model parameters obtained from the other processing nodes can be removed from the allocated space in the HBM to make room for the model parameters of the next layer. It should be noted that each processing node may still retain the sharded portion that the particular processing node is responsible for in its main memory.

Figure 4E:
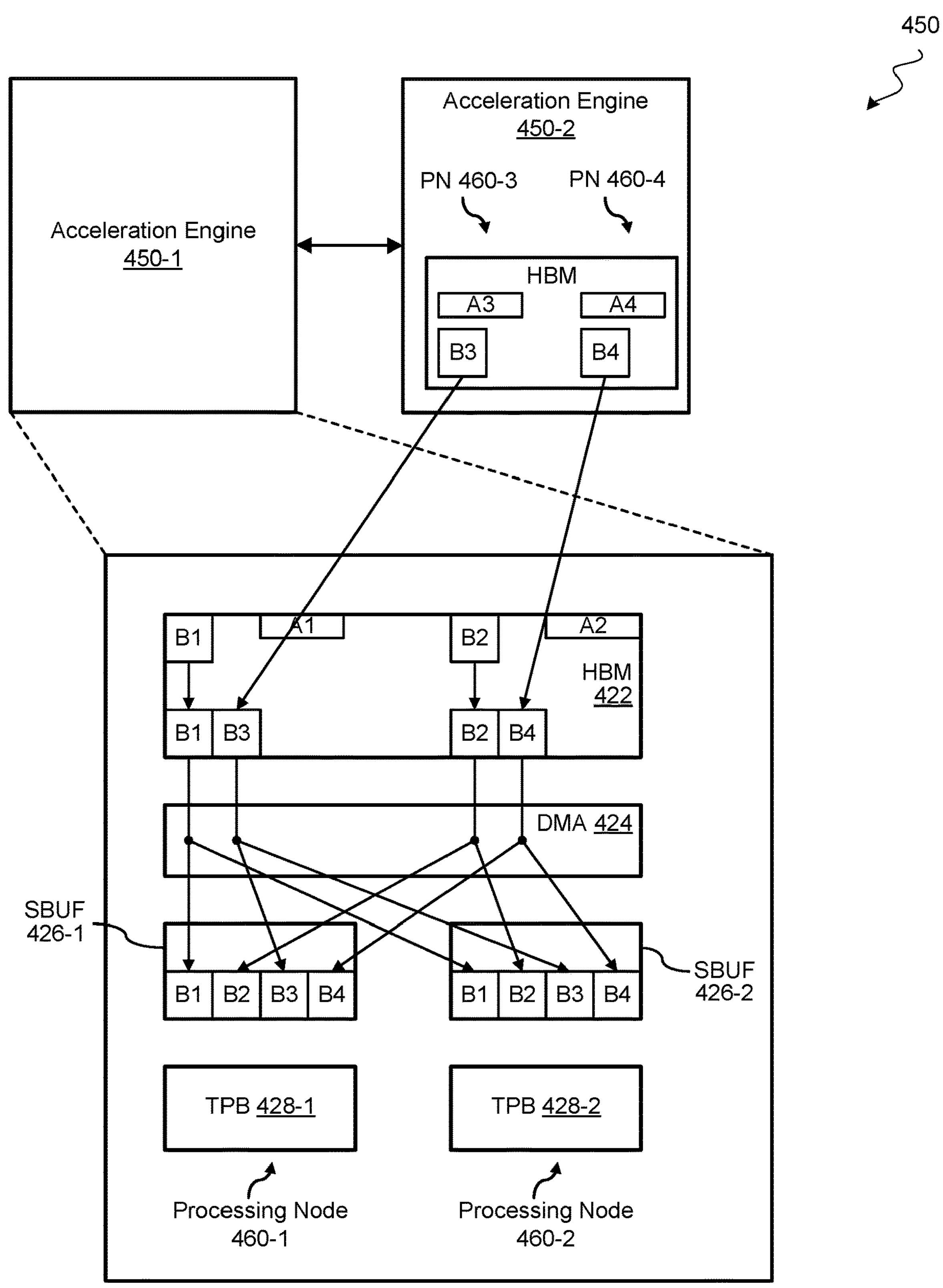
FIG. 4E illustrates another example of a system of processing nodes with shared memory to implement fully sharded data parallel execution.

FIG. 4E illustrates another example of a system 450 that provides shared memory parallel execution for the processing nodes to reduce the memory footprint and memory bandwidth utilized for transferring model parameters. System 450 may include acceleration engines 450-1 and 450-2 coupled to a host system (not shown). Acceleration engine 450-1 may include two processing nodes 460-1 and 460-2. Processing node 460-1 may include a state buffer 426-1 and tensor processing block 428-1. Processing node 460-2 may include a similar set of components including state buffer 426-2 and tensor processing block 428-2. These components are similar to those discussed above with reference to acceleration engine 400-1 in system 400. Acceleration engine 450-1 differs from acceleration engine 400-1 in that the main memories of processing nodes 460-1 and 460-2 can be integrated in the same memory device (e.g., implemented with HBM 422). In other words, HBM 422 can provide the respective main memories shared by processing nodes 460-1 and 460-2. The sets of DMA engines of processing nodes 460-1 and 460-2 can also be integrated into the one set of DMA engines 424 in which any of the DMA engines can service data transfers for either processing node. Acceleration engine 450-2 may also include two processing nodes (PN) 460-3 and 460-4, and may have a similar structure as acceleration engine 450-1. The operation of system 450 to implement fully sharded data parallel execution is similar to those described above with reference to system 400, and hence a detailed explanation of which need not be repeated.

FIG. 5 illustrates a flow diagram of an example of a process 500 for performing a collective compute operation when executing a neural network model. Process 500 can be performed in a system having M number of processing nodes (e.g., system 300, 400, or 450). In some implementations, process 500 can be implemented on a non-transitory computer-readable medium as instructions or code executable by a host processor to execute the neural network model in the M number of processing nodes. In some implementations, process 500 can be used to implement fully sharded data parallel execution of the neural network model.

The system of processing nodes can be part of a host system, and the M number of processing nodes can be implemented in (M/N) number of integrated circuit devices in which each integrated circuit device has N number of processing nodes (e.g., 2, 4, 8, 16, or other number of processing nodes). An example of such an integrated circuit device can be an acceleration engine having N number of neural network accelerators operating as the N number of processing nodes. Each processing node may include a main memory such as a high bandwidth memory (HBM), a set of DMA engines, a state buffer, and a tensor processing block such as a systolic array. The main memory of each processing node belonging to an integrated circuit device can be shared amongst the other processing nodes in the integrated circuit device to provide shared memory parallel execution.

Process 500 can be performed, for example, by a runtime driver that manages the operations such as collective compute operations of the integrated circuit device (e.g., acceleration engine). The runtime driver can provide an interface between applications executing on the host system and the integrated circuit device. For example, the runtime driver can provide an Application Program Interface (API) that defines functions for feeding input data to the integrated circuit device, and defining the operations and computations to perform on the input data. The runtime driver can configure the integrated circuit device to perform the operations and computations.

For example, the runtime driver can identify a neural network model that the integrated circuit device is to execute, as well as the location in the memory or storage device where the compiled code for the neural network model is located. The runtime driver can further load into the integrated circuit device or cause the integrated circuit device to load the compiled code and input data on which the neural network model is to operate. The runtime driver can cause the integrated circuit device to begin executing on the input data. Once the integrated circuit device has finished, the integrated circuit device can notify the runtime driver, and the runtime driver can deliver a result back to the application that requested the result. During execution of the neural network model, the runtime driver can manage the movement of data (e.g., input data, intermediate results, etc.) and parameters (e.g., weight values, gradients, etc.) between memory and the integrated circuit device, for example, by controlling the DMA engines and preparing the memory descriptor executed by the DMA engines. The runtime driver can be configured with the values M and N to enable the runtime driver to manage and allocate space in the shared memory for the collective compute operation.

Prior to executing process 500, a set of parameters (e.g., weight values, gradients, and/or other model parameters) can be partitioned into M number of sharded portions of parameters for the M number of processing nodes. Each of the processing nodes can be responsible for maintaining a sharded portion of the parameters. This may include storing the sharded portion in the main memory of the processing node, and/or updating the sharded portion of parameters (e.g., during training). In some implementations, the set of parameters may correspond to the weight values or gradients of a layer of the neural network model. A batch of input data can also be partitioned into M number of minibatches of input data to provide each of the M number of processing nodes with a minibatch of input data. The main memory of each processing node may store a sharded portion of the parameters and a minibatch of input data for processing.

Process 500 may begin at block 502 by allocating an amount of space in the shared memory (e.g., main memory such as HBM) of a processing node for the collective compute operation operating on M number of sharded portions of parameters. As mentioned above, the processing node can be part of an integrated circuit device having N number of processing nodes. The amount of space allocated in the shared memory may correspond to (M/N) number of sharded portions of parameters. By way of example, the collective compute operation can be an all-gather operation or an all-reduce operation. An all-reduce operation can be decomposed into a reduce-scatter operation to generate reduced values, followed by an all-gather operation to distribute the reduced values. Process 500 can be used, for example, to distribute the reduced values.

At block 504, the sharded portion of parameters that the processing node is responsible for is stored in the allocated space of the shared memory of the processing node. In some implementations, when the host system initially provided the processing node with the sharded portion of parameters, the host system can place the sharded portion in a separate region of the shared memory reserved for data and parameters retained by the processing node. In such scenarios, the shard portion of parameters can be copied into the space allocated by block 502. In some implementations, the location in the shared memory where the host system initially placed the sharded portion can be designated as part of the space allocated by block 502. In such cases, the sharded portion of parameters that the processing node is responsible for need not be copied from one location to another in the shared memory.

At block 506, an additional (M/N)−1 number of sharded portions of parameters are obtained from other integrated circuit devices to store a total of (M/N) number of sharded portions of parameters in the allocated space of the shared memory of the processing node. For example, each of the other integrated circuit devices in the system can provide a sharded portion of parameters to the local processing node. The sharded portion provided by each of the other integrated circuit devices in the system can be the sharded portion maintained by the corresponding processing node having the same index as the local processing node. For example, if the local processing node collecting the sharded portions is the first processing node of the local integrated circuit device, then the sharded portion maintained at the first processing node in each of the other integrated circuit devices in the system is copied into the allocated space of the shared memory of the local processing node.

Blocks 502 to 506 can be performed for each of the N number of processing nodes in the integrated circuit device. After completion of block 506, each of the N number of processing nodes in the integrated circuit device will have a different set of (M/N) number of sharded portions of parameters stored in the respective allocated spaces in the shared memories. Hence, collectively, the integrated circuit device will have gathered M number of sharded portions of parameters.

At block 508, each of the (M/N) sharded portion of parameters stored in the shared memory of the processing node is multicasted to a state buffer of each of the N number of processing nodes in the integrated circuit device to provide each state buffer with the M number of sharded portions of parameters for the collective compute operation. Each of the processing nodes in the system can perform the same. Multicasting a sharded portion of parameters may include reading the sharded portion of parameters once from the shared memory, and writing the sharded portion of parameters to each of N number of state buffers in the integrated circuit device. The multicasting can be performed, for example, by a set of one or more direct memory access (DMA) engines of the integrated circuit device. At completion of block 508, each of the state buffers in the system will have the full set of parameters gathered from the M number of processing nodes in the system.

Each processing node in the system can also load the corresponding minibatch of input data that the processing node is responsible for processing into the state buffer of the processing node. The full set of parameters (e.g., weight values or gradients corresponding to a layer of the neural network) and the minibatch of input data are loaded from the state buffer into a tensor processing block of the corresponding processing node, and computations can then be performed on the full set of parameters and the minibatch of input data. Each processing node can process its minibatch of input data in parallel with the other processing nodes. Subsequent layers of the neural network model can be executed in a similar manner by repeating process 500.

FIG. 5 is a block diagram illustrating an example of an accelerator 502 that can be used as part of a processing node. In various examples, the accelerator 502, for a set of input data (e.g., input data 550), can execute computations using a processing engine array 510, an activation engine 516, a vector engine 517, and/or a pooling engine 518. In some examples, the example accelerator 502 may be an integrated circuit component of a processor, such as a neural network processor. The processor may have other integrated circuit components, including additional accelerator engines.

In various implementations, the memory subsystem 504 can include multiple memory banks 514. Memory subsystem 504 can also be referred to as a state buffer. In these implementations, each memory bank 514 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 514. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 504 can permit simultaneous access to the read or write channels of multiple memory banks. As another example, the memory subsystem 504 can include arbitration logic such that arbitration between, for example, the outputs of multiple memory banks 514 can result in more than one memory bank's output being used. In these and other examples, though globally managed by the memory subsystem 504, each memory bank can be operated independently of any other.

Having the memory banks 514 be independently accessible can increase the efficiency of the accelerator 502. For example, values can be simultaneously read and provided to each row of the processing engine array 510, so that the entire processing engine array 510 can be in use in one clock cycle. As another example, the memory banks 514 can be read at the same time that results computed by the processing engine array 510 are written to the memory subsystem 504. In contrast, a single memory may be able to service only one read or write at a time. With a single memory, multiple clock cycles can be required, for example, to read input data for each row of the processing engine array 510 before the processing engine array 510 can be started.

In various implementations, the memory subsystem 504 can be configured to simultaneously service multiple clients, including the processing engine array 510, the activation engine 516, the vector engine 517, the pooling engine 518, and any external clients that access the memory subsystem 504 over a communication fabric 520. In some implementations, being able to service multiple clients can mean that the memory subsystem 504 has at least as many memory banks as there are clients. In some cases, each row of the processing engine array 510 can count as a separate client. In some cases, each column of the processing engine array 510 can output a result, such that each column can count as a separate write client. In some cases, output from the processing engine array 510 can be written into the memory banks 514 that can then subsequently provide input data for the processing engine array 510. As another example, the activation engine 516, the vector engine 517, and the pooling engine 518 can include multiple execution channels, each of which can be separate memory clients. The memory banks 514 can be implemented, for example, using static random access memory (SRAM).

In various implementations, the memory subsystem 504 can include control logic. The control logic can, for example, keep track of the address spaces of each of the memory banks 514, identify memory banks 514 to read from or write to, and/or move data between the memory banks 514. In some implementations, memory banks 514 can be hardwired to particular clients. For example, a set of memory banks 514 can be hardwired to provide values to the rows of the processing engine array 510, with one memory bank servicing each row. As another example, a set of memory banks can be hard wired to receive values from columns of the processing engine array 510, with one memory bank receiving data for each column.

The processing engine array 510 (e.g., a systolic array) is the computation matrix of the example accelerator 502 and can be used to implement a tensor processing block. The processing engine array 510 can, for example, execute parallel integration, convolution, correlation, and/or matrix multiplication, among other things. The processing engine array 510 includes multiple processing engines 511, arranged in rows and columns, such that results output by one processing engine 511 can be input directly into another processing engine 511. Processing engines 511 that are not on the outside edges of the processing engine array 510 thus can receive data to operate on from other processing engines 511, rather than from the memory subsystem 504.

In various examples, the processing engine array 510 uses systolic execution, in which data arrives at each processing engine 511 from different directions at regular intervals. In some examples, input data can flow into the processing engine array 510 from the left and weight values can be loaded at the top. In some examples weights and input data can flow from the left and partial sums can flow from top to bottom. In these and other examples, a multiply-and-accumulate operation moves through the processing engine array 510 as a diagonal wave front, with data moving to the right and down across the array. Control signals can be input at the left at the same time as weights, and can flow across and down along with the computation.

In various implementations, the number of columns in the processing engine array 510 determines the computational capacity of the processing engine array 510, and the number of rows determines the required memory bandwidth for achieving maximum utilization of the processing engine array 510. The processing engine array 510 can have, for example, 64 columns and 128 rows, or some other number of columns and/or rows.

An example of a processing engine 511 is illustrated in FIG. 5 in an inset diagram. As illustrated by this example, a processing engine 511 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 511.

In the illustrated example, an input from above can include a partial sum, p_in, provided either from another processing engine 511 or from a previous round of computation by the processing engine array 510. When starting a computation for a new set of input data, the top row of the processing engine array 510 can receive a fixed value for p_in, such as zero. As illustrated by this example, i and w are multiplied together and the result is summed with p_in to produce a new partial sum, p_out, which can be input into another processing engine 511. Various other implementations of the processing engine 511 are possible.

Outputs from the last row in the processing engine array 510 can be temporarily stored in the results buffer 512. The results can be intermediate results, which can be written to the memory banks 514 to be provided to the processing engine array 510 for additional computation. Alternatively, the results can be final results, which, once written to the memory banks 514 can be read from the memory subsystem 504 over the communication fabric 520, to be output by the system.

In some implementations, the accelerator 502 includes an activation engine 516. In these implementations, the activation engine 516 can combine the results from the processing engine array 510 into one or more output activations. For example, for a convolutional neural network, convolutions from multiple channels can be summed to produce an output activation for a single channel. In other examples, accumulating results from one or more columns in the processing engine array 510 may be needed to produce an output activation for a single node in the neural network. In some examples, activation engine 516 can be bypassed.

In various examples, the activation engine 516 can include multiple separate execution channels. In these examples, the execution channels can correspond to the columns of the processing engine array 510, and can perform an operation on the outputs of a column, the result of which can be stored in the memory subsystem 504. In these examples, the activation engine 516 may be able to perform between 1 and n parallel computations, where n is equal to the number of columns in the processing engine array 510. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 502 can include a pooling engine 518. Pooling is the combining of outputs of the columns of the processing engine array 510. Combining can include for example, computing a maximum value, a minimum value, an average value, a median value, a summation, a multiplication, or another logical or mathematical combination. In various examples, the pooling engine 518 can include multiple execution channels that can operating on values from corresponding columns of the processing engine array 510. In these examples, the pooling engine 518 may be able to perform between 1 and n parallel computations, where n is equal to the number of columns in the processing engine array 510. In various examples, execution channels of the pooling engine 518 can operate in parallel and/or simultaneously. In some examples, the pooling engine 518 can be bypassed.

In some implementations, the accelerator 502 can further include a vector engine 517. Vector engine 517 is a compute engine that can perform computations and manipulations on values stored in memory subsystem 504 and/or results buffer 512 such as values representing matrices of input values, weight values, intermediate results, etc. Vector engine 517 can include multiple execution channels each with a pipeline of computation circuit blocks (e.g., arithmetic logic units) to perform complex computations such as nested multiply-and-add operations and/or complex manipulations such as sorting operations. In various examples, execution channels of the vector engine 517 can operate in parallel and/or simultaneously. In some examples, the vector engine 517 can be bypassed or be omitted.

Herein, the activation engine 516, the vector engine 517, and the pooling engine 518 may be referred to collectively as execution engines. The processing engine array 510 is another example of an execution engine. Another example of an execution engine is a Direct Memory Access (DMA) engine, which may be located outside the accelerator 502.

Input data 550 can arrive over the communication fabric 520. The communication fabric 520 can connect the accelerator 502 to other components of a processor, such as a DMA engine that can obtain input data 550 from an Input/Output (I/O) device, a storage drive, or a network interface. The input data 550 can be, for example one-dimensional data, such as a character string or numerical sequence, or two-dimensional data, such as an array of pixel values for an image or frequency and amplitude values over time for an audio signal. In some examples, the input data 550 can be three-dimensional, as may be the case with, for example, the situational information used by a self-driving car or virtual reality data. In some implementations, the memory subsystem 504 can include a separate buffer for the input data 550. In some implementations, the input data 550 can be stored in the memory banks 514 when the accelerator 502 receives the input data 550.

In some examples, the accelerator 502 can implement a neural network processing engine. In these examples, the accelerator 502, for a set of input data 550, can execute a neural network to perform a task for which the neural network was trained. Executing a neural network on a set of input data can be referred to as inference or performing inference.

The weights for the neural network can be stored in the memory subsystem 504, along with input data 550 on which the neural network will operate. The neural network can also include instructions, which can program the processing engine array 510 to perform various computations on the weights and the input data. The instructions can also be stored in the memory subsystem 504, in the memory banks 514 or in a separate instruction buffer. The processing engine array 510 can output intermediate results, which represent the outputs of individual layers of the neural network. In some cases, the activation engine 516, the vector engine 517, and/or pooling engine 518 may be enabled for computations called for by certain layers of the neural network. The accelerator 502 can store the intermediate results in the memory subsystem 504 for inputting into the processing engine array 510 to compute results for the next layer of the neural network. The processing engine array 510 can further output final results from a last layer of the neural network. The final results can be stored in the memory subsystem 504 and then be copied out to host processor memory or to another location.

Figure 6:
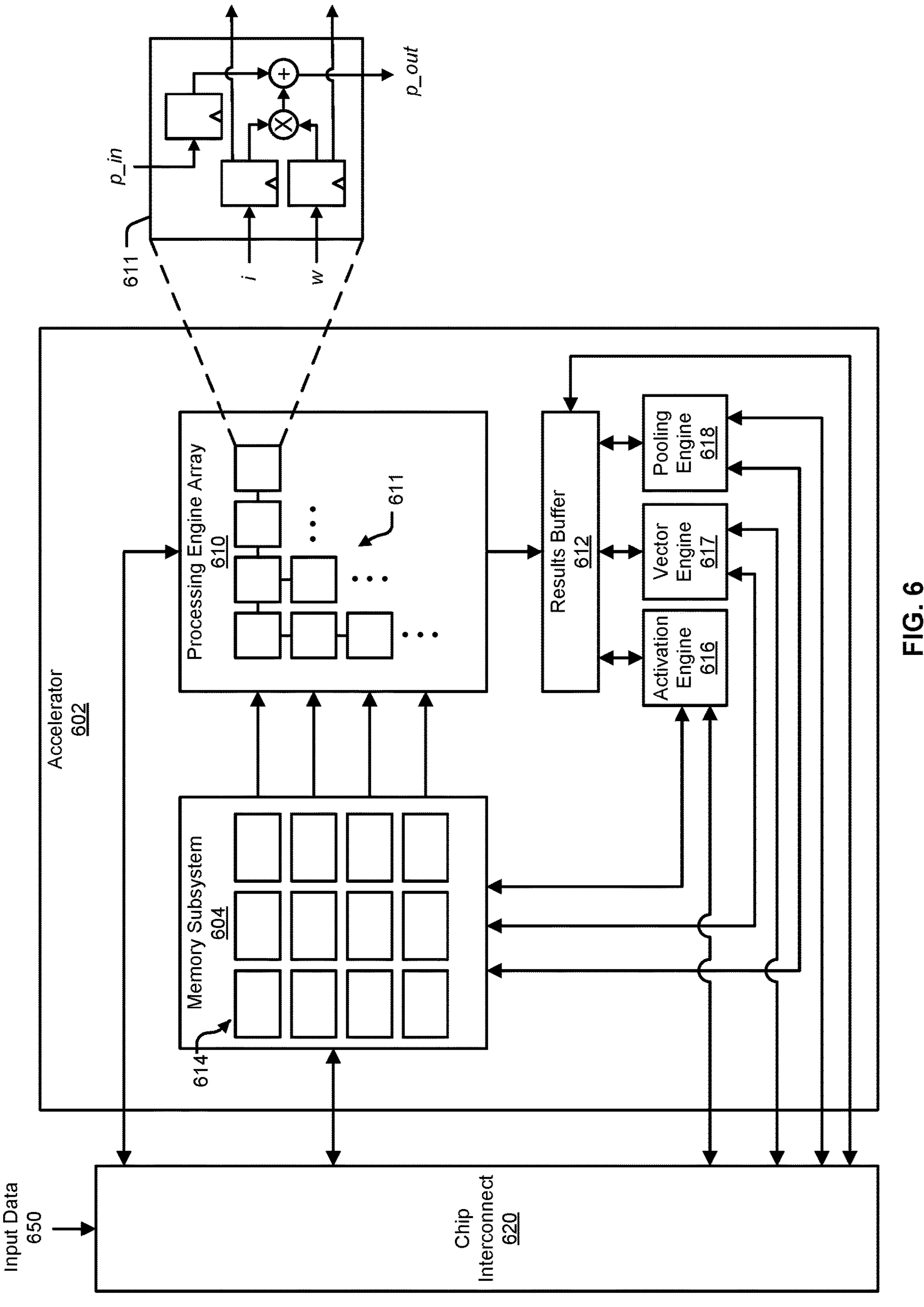
FIG. 6 illustrates a block diagram of an example of a processing node.

FIG. 6 includes a block diagram that illustrates an example of an acceleration engine 600. The acceleration engine 600 is an example of an integrated circuit that can include one or more accelerators **602*a*-602*n* that may be similar to the accelerator illustrated in FIG. 5**.

In the example of FIG. 6, the acceleration engine 600 includes multiple accelerators **602*a*-602*n*, each of which can perform a set of operations. In various examples, the accelerators 602*a*-602*n* are for particular types of operations, so that the accelerators 602*a*-602*n* can perform the operations much faster than when similar operations are performed by a general-purpose processor. In various examples, to perform a set of operations, input data on which the operations are to be performed must first be moved into the accelerators 602*a*-602*n*. Additionally, in some cases, program code is also moved into the accelerators 602*a*-602*n*, which programs the operations that the accelerators 602*a*-602*n* will perform on the data. In the illustrated example, the acceleration engine 600 includes n accelerators 602*a*-602*n*. Examples of accelerators that can be included in the acceleration engine 600 include graphics accelerators, floating point accelerators, neural network accelerators, and others. In various examples, the accelerators 602*a*-602*n* can each be the same (e.g., each of the is a graphics accelerator) or can be different (e.g., the accelerators 602*a*-602*n*** include a graphics accelerator, a floating point accelerator, and neural network accelerator).

The example acceleration engine 600 further includes DRAM controllers **642*a*-642*k* for communicating with an external memory. The external memory is implemented, in this example, using DRAM 630. In the illustrated example, the acceleration engine 600 includes k DRAM controllers 642*a*-642*k*, each of which may be able to communicate with an independent set of banks of DRAM. In other examples, other types of RAM technology can be used for the external memory. The DRAM controllers 642*a*-642*k*** can also be referred to as memory controllers.

In various examples, input data and/or program code for the accelerators **602*a*-602*n* can be stored in the DRAM 630**.

Different programs can cause the accelerators 602*a*-602*n* to perform different operations. For example, when one of the accelerators is a neural network accelerator, one program can configure the neural network accelerator to perform speech recognition while another program can configure the neural network accelerator to perform image recognition. In various examples, different accelerators 602*a*-602*n* can be programmed with different programs, so that each performs a different set of operations. In various examples, the processors 648*a*-648*s* can manage moving of program code from the DRAM 630 to the accelerators 602*a*-602*n*.

The example acceleration engine 600 further includes I/O controllers 644*a*-644*p* for communicating with I/O devices 632 in the system. The acceleration engine 600 can communicate with I/O devices over, for example, a processor bus. In some examples, the processor bus can be implemented using Peripheral Component Interconnect (PCI) and/or a variation of the PCI bus protocol. The processor bus can connect the acceleration engine 600 to I/O devices such as, for example, input and output devices, memory controllers, storage devices, and/or network interface cards, among other things. In some examples, the I/O controllers 644-644*p* can enable the acceleration engine 600 to act as an I/O device for a host processor. For example, the acceleration engine 600 can be the recipient of input data from the host processor, and a command indicating an operation to be performed on the input data (e.g., a particular computation or analysis). In the illustrated example, the acceleration engine 600 includes p I/O controllers 644*a*-644*p*, each of which may include a separate root complex and may communicate with a separate set of I/O devices 632. In other examples, other standardized bus protocols, such as Ultra Path Interconnect (UPI) can be used for the host bus. In other examples, a proprietary bus protocol can be used.

Movement of data in the acceleration engine 600 can be managed by one or more processors 648*a*-648*s*, which can also be referred to as data management processors. In the example of FIG. 6, the acceleration engine 600 includes s processors 648*a*-648*s* incorporated into the device (e.g., on the same silicon die). In other examples, the processors 648*a*-648*s* can be external to the acceleration engine 600 (e.g., on a different die and/or in a different package). In some examples, the processors 648*a*-648*s* can manage the movement of data from I/O devices 632 to the accelerators 602*a*-602*n* or the DRAM 630. For example, input data may be located at an I/O device 632 or in processor memory, and the processors 648*a*-648*s* can move the input from the I/O device 632 or processor memory into an accelerator or into DRAM 630. As another example, program code for the accelerators 602*a*-602*n* may be located on an I/O device 632 or in processor memory.

The example acceleration engine 600 further includes DMA engines 646*a*-646*d* that can move data between the accelerators 602*a*-602*n*, DRAM controllers 642*a*-642*k*, and I/O controllers 644*a*-644*p*. In the illustrated example, the acceleration engine 600 includes d DMA engines 646*a*-646*d*. In some implementations, the DMA engines 646*a*-646*d* can be assigned to specific tasks, such as moving data from the DRAM controllers 642*a*-642*d* to the accelerators 602*a*-602*n*, or moving data between the I/O controllers 644*a*-644*p* and the accelerators 602*a*-602*n*. These tasks can be assigned, for example, by enqueueing descriptors with the DMA engines 646*a*-646*d*, where a descriptor identifies an address for a block of data and an operation (e.g., a read or a write) to perform. A descriptor, for example, can direct a DMA engine to instruct a DMA controller to read a block of data from DRAM 630. A descriptor can, as a further example, instruct the DMA engine to write data, read by the DMA controller, to an accelerator. Further descriptors can be used to move data from an accelerator to DRAM 630.

In various examples, each of the processors 648*a*-648*s* can be responsible for managing the data movement for a different accelerator. In some examples, a processor may manage the data movement for more than one accelerator. Similarly, in various examples, each of the processors 648*a*-648*s* can be assigned to one or more DMA engines 646*a*-646*d*. In these and other examples, associations between processors 648*a*-648*s*, accelerators 602*a*-602*n*, and DMA engines 646*a*-646*d* are determined by program code being executed by each respective processor.

In the example acceleration engine 600, the various components can communicate over a chip interconnect 620. The chip interconnect 620 primarily includes wiring for routing data between the components of the acceleration engine 600. In some cases, the chip interconnect 620 can include a minimal amount of logic, such as multiplexors to control the direction of data, flip-flops for handling clock domain crossings, and timing logic.

Figure 7:
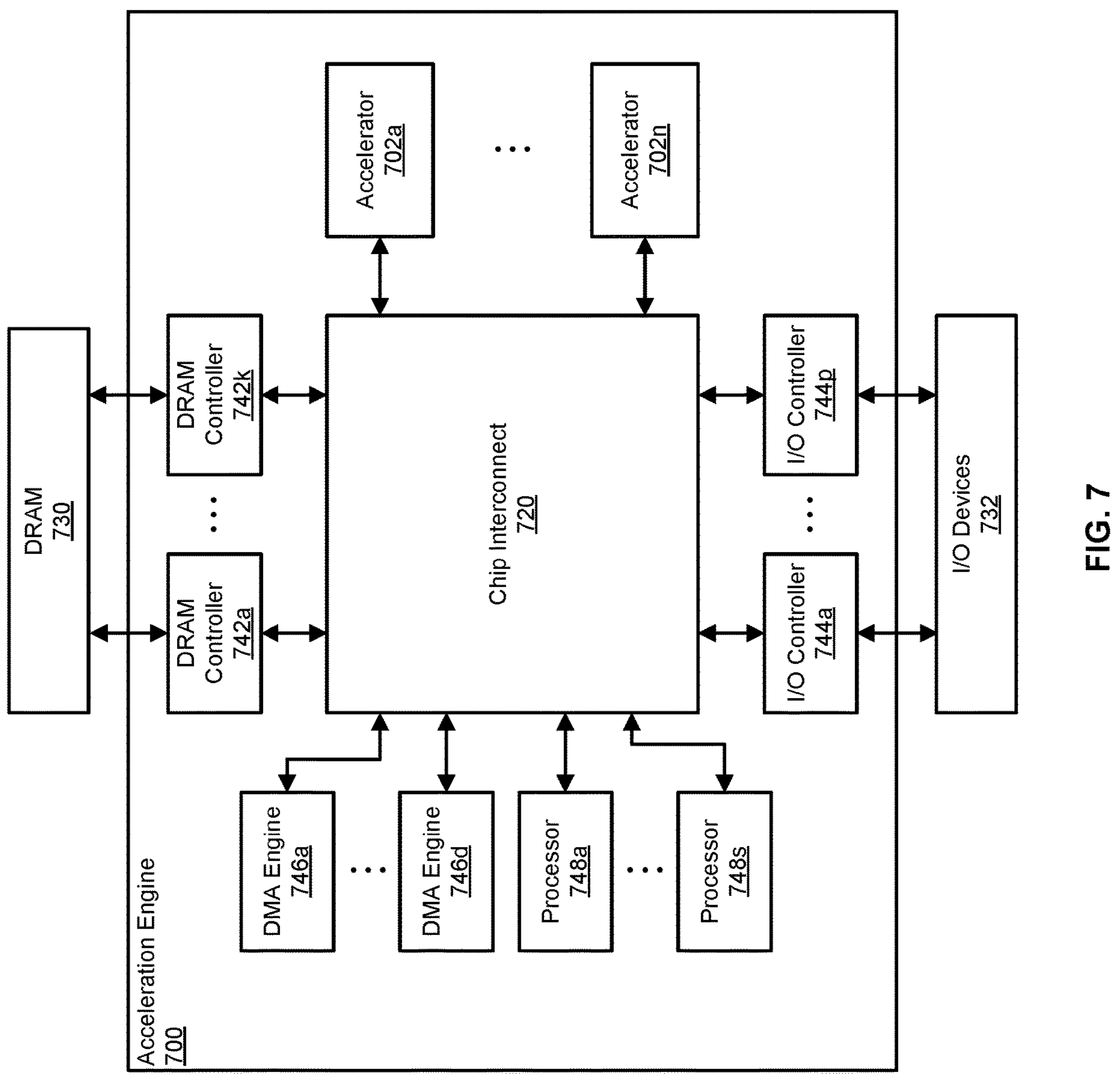
FIG. 7 illustrates a block diagram of an example of an acceleration engine.
Figure 8:
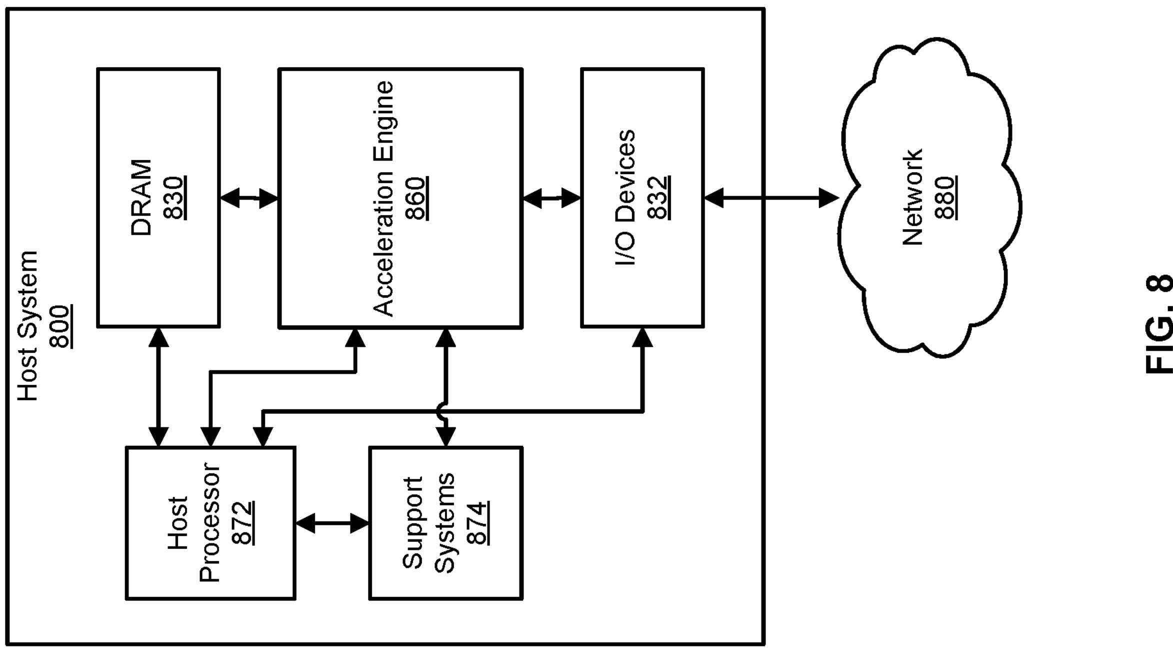
FIG. 8 illustrates a block diagram of an example of a host system.

FIG. 7 includes a block diagram that illustrates an example of a host system 700 in which an acceleration engine 760 can be used. The acceleration engine 760 of FIG. 7 is an example of a device that can include one or more accelerators such as is illustrated in FIG. 6. The example host system 700 of FIG. 7 includes the acceleration engine 760, a host processor 772, DRAM 730 or processor memory, I/O devices 732, and support systems 774. In various implementations, the host system 700 can include other hardware that is not illustrated here.

The host processor 772 is a general-purpose integrated circuit that is capable of executing program instructions. In some examples, the host processor 772 can include multiple processing cores. A multi-core processor may include multiple processing units within the same processor. In some examples, the host system 700 can include more than one host processor 772. In some examples, the host processor 772 and the acceleration engine 760 can be one chip, such as, one or more integrated circuits within the same package.

In various examples, the host processor 772 can communicate with other components in the host system 700 over one or more communication channels. For example, the host system 700 can include a host processor bus, which the host processor 772 can use to communicate with the DRAM 730, for example. As another example, the host system 700 can include an I/O bus, such as a PCI-based bus, over which the host processor 772 can communicate with the acceleration engine 760 and/or the I/O devices 732, for example. In various examples, the host system 700 can, alternatively or additionally, include other communication channels or busses, such as serial busses, power management busses, storage device busses, and so on.

In some examples, software programs executing on the host processor 772 can receive or generate input for processing by the acceleration engine 760. In some examples, the programs can select an appropriate neural network to execute for a given input. For example, a program may be for language translation, and can select one or more neural networks capable of speech recognition and/or machine translation. In these and other examples, the programs can configure the acceleration engine 760 with the neural network to execute, and/or can select a neural network processing engine on the acceleration engine 760 that has previously been configured to execute the desired neural network. In some examples, once the acceleration engine 760 has started an inference on input data, the host processor

772 can manage the movement of data (such as weights, instructions, intermediate results, results of conditional layers, and/or final results) into or out of the acceleration engine 760.

In some examples, a software program that is using the acceleration engine 760 to conduct an inference can read the result from a conditional layer from the acceleration engine 760 and/or from a storage location, such as in DRAM 730. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 730 is memory that is used by the host processor 772 for storage of program code that the host processor 772 is in the process of executing, as well as values that are being operated on. In some examples, the data for a neural network (e.g., weight values, instructions, and other data) can be all or partially stored in the DRAM 730. DRAM is a common term for processor memory, and though DRAM is volatile memory, processor memory can be volatile and/or non-volatile. Though not illustrated here, the host system 700 can include other volatile and non-volatile memories for other purposes. For example, the host system 700 can include a Read-Only Memory (ROM) that stores boot code for booting the host system 700 at power on, and/or Basic Input/Output System (BIOS) code.

Though not illustrated here, the DRAM 730 can store instructions for various programs, which can be loaded into and be executed by the host processor 772. For example, the DRAM 730 can be storing instructions for an operating system, one or more data stores, one or more application programs, one or more drivers, and/or services for implementing the features disclosed herein.

The operating system can manage and orchestrate the overall operation of the host system 700, such as scheduling tasks, executing applications, and/or controller peripheral devices, among other operations. In some examples, a host system 700 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 700. For example, some drivers can provide communication between the operating system and peripheral devices or I/O devices 732. Alternatively or additionally, some drivers may provide communication between application programs and the operating system, and/or application programs and peripheral devices accessible to the host system 700. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 732 can include hardware for connecting to user input and output devices, such as keyboards, mice, pens, tablets, voice input devices, touch input devices, displays or monitors, speakers, and printers, among other devices. The I/O devices 732 can also include storage drives and/or network interfaces for connecting to a network 780. For example, the host system 700 can use a network interface to communicate with storage devices, user terminals, other computing devices or servers, and/or other networks, among various examples.

In various examples, one or more of the I/O devices 732 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 700 or may be in an external enclosure. A storage device can be fixed (e.g., attached by screws) or removable (e.g., having a physical release mechanism and possibly a hot-plug mechanism).

Storage devices, the DRAM 730, and any other memory component in the host system 700 are examples of computer-readable storage media. Computer-readable storage media are physical mediums that are capable of storing data in a format that can be read by a device such as the host processor 772. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 732 can be PCI-based devices. In these examples, a PCI-based I/O device includes a PCI interface for communicating with the host system 700. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A “function” describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 774 can include hardware for coordinating the operations of the acceleration engine 760. For example, the support systems 774 can include a microprocessor that coordinates the activities of the acceleration engine 760, including moving data around on the acceleration engine 760. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 772. In some examples, the program executed by the microprocessor is stored on the hardware of microprocessor, or on a non-volatile memory chip in the host system 700. In some examples, the microprocessor and the acceleration engine 760 can be on chip, such as one integrated circuit on the same die and in the same package.

In some examples, the support systems 774 can be responsible for taking instructions from the host processor 772 when programs executing on the host processor 772 request the execution of a neural network. For example, the host processor 772 can provide the support systems 774 with a set of input data and a task that is to be performed on the set of input data. In this example, the support systems 774 can identify a neural network that can perform the task, and can program the acceleration engine 760 to execute the neural network on the set of input data. In some examples, the support systems 774 only needs to select an appropriate neural network processing engine of the neural network processor. In some examples, the support systems 774 may need to load the data for the neural network onto the acceleration engine 760 before the acceleration engine 760 can start executing the neural network. In these and other examples, the support systems 774 can further receive the output of executing the neural network, and provide the output back to the host processor 772.

In some examples, the operations of the support systems 774 can be handled by the host processor 772. In these examples, the support systems 774 may not be needed and can be omitted from the host system 700.

In various examples, the host system 700 can include a combination of host systems, processor nodes, storage subsystems, and I/O chassis that represent user devices, service provider computers or third-party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 700 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method for performing a collective compute operation in a system having M number of processing nodes, wherein the M number of processing nodes are implemented in (M/N) number of acceleration engines each having N number of processing nodes, and each processing node includes a high bandwidth memory (HBM), a state buffer, and a tensor processing block, the method comprising:

partitioning a set of weight parameters into M number of sharded portions of weight parameters to provide each of the M number of processing nodes with a sharded portion of weight parameters;

partitioning a batch of input data into M number of minibatches of input data to provide each of the M number of processing nodes with a minibatch of input data;

storing each sharded portion of weight parameters and each minibatch of input data in the HBM of their corresponding processing node in the system; and for each of the processing nodes in each acceleration engine:

allocating an amount of space for (M/N) number of sharded portions of weight parameters in the HBM;

obtaining a sharded portion of weight parameters from a corresponding process node of each of the acceleration engines to gather (M/N) number of sharded portions of weight parameters in the HBM of the processing node;

for each of the (M/N) number of sharded portions of weight parameters stored in the HBM of the processing node, multicasting the sharded portion of weight parameters to the state buffer of each processing node within the acceleration engine to provide each state buffer with the set of weight parameters;

loading the minibatch of input data from the HBM into the state buffer of the processing node;

loading the set of weight parameters and the minibatch of input data from the state buffer into the tensor processing block of the processing node; and performing computations on the set of weight parameters and the minibatch of input data in the tensor processing block.

2. The method of claim 1, wherein multicasting the sharded portion of weight parameters within each acceleration engine is performed by a set of one or more direct memory access (DMA) engines in the acceleration engine.

3. The method of claim 1, wherein the collective compute operation is managed by a runtime driver of the system based on the N number of processing nodes in each acceleration engine and the (M/N) number of acceleration engines in the system.

4. The method of claim 1, wherein the set of weight parameters corresponds to a layer of a neural network model.

5. A method comprising:

performing in each of N number of processing nodes of an integrated circuit device that is part of a system of M number of processing nodes implemented in (M/N) number of integrated circuit devices:

allocating an amount of space in a shared memory of a processing node for a collective compute operation operating on M number of sharded portions of parameters, wherein the amount of space allocated in the shared memory corresponds to (M/N) number of sharded portions of parameters;

storing a sharded portion of parameters associated with the processing node in the allocated space of the shared memory of the processing node;

obtaining (M/N)−1 number of sharded portions of parameters from other integrated circuit devices to store (M/N) number of sharded portions of parameters in the allocated space of the shared memory of the processing node; and for each of the (M/N) number of sharded portions of parameters stored in the shared memory of the processing node, multicasting the sharded portion of parameters to a state buffer of each of the N number of processing nodes in the integrated circuit device to provide each state buffer with the M number of sharded portions of parameters for the collective compute operation.

6. The method of claim 5, wherein multicasting the sharded portion of parameters includes reading the sharded portion of parameters once from the shared memory, and writing the sharded portion of parameters to each state buffer in the integrated circuit device.

7. The method of claim 6, wherein multicasting the sharded portion of parameters is performed by a set of one or more direct memory access (DMA) engines of the integrated circuit device.

8. The method of claim 5, wherein the M number of sharded portions of parameters correspond to weight values of a layer of a neural network model.

9. The method of claim 8, further comprising:

loading a minibatch of input data into the state buffer of the processing node;

loading the weight values and the minibatch of input data from the state buffer into a tensor processing block of the processing node; and performing computations on the weight values and the minibatch of input data.

10. The method of claim 9, wherein the minibatch of input data is one of a plurality of minibatches of input data partitioned from a batch of input data, and each processing node of the integrated circuit device processes one of the minibatches of input data in parallel with the other processing nodes of the integrated circuit device.

11. The method of claim 5, wherein memory allocation and data transfers for the collective compute operation are managed by a runtime driver of the integrated circuit device.

12. The method of claim 11, wherein the runtime driver is configured with the values M and N to enable the runtime driver to allocate space in the shared memory for the collective compute operation.

13. The method of claim 5, wherein the collective compute operation is an all-gather operation or an all-reduce operation.

14. A non-transitory computer readable medium having stored therein instructions that, when executed by one or more processors, cause the one or more processors to execute a runtime driver, the runtime driver performing operations in each of N number of processing nodes of an integrated circuit device that is part of a system of M number of processing nodes implemented in (M/N) number of integrated circuit devices, the operations including:

allocating an amount of space in a shared memory of a processing node for a collective compute operation operating on M number of sharded portions of parameters, wherein the amount of space allocated in each shared memory corresponds to (M/N) number of sharded portions of parameters;

storing a sharded portion of parameters associated with the processing node in the allocated space of the shared memory of the processing node;

obtaining (M/N)−1 number of sharded portions of parameters from other integrated circuit devices to store (M/N) number of sharded portions of parameters in the allocated space of the shared memory of the processing node; and for each of the (M/N) number of sharded portions of parameters stored in the shared memory of the processing node, multicasting the sharded portion of parameters to a state buffer of each of the N number of processing nodes in the integrated circuit device to provide each state buffer with the M number of sharded portions of parameters for the collective compute operation.

15. The non-transitory computer readable medium of claim 14, wherein multicasting the sharded portion of parameters includes reading the sharded portion of parameters once from the shared memory, and writing the sharded portion of parameters to each of N number of state buffers in the integrated circuit device.

16. The non-transitory computer readable medium of claim 14, wherein the operations further include:

loading a minibatch of input data into the state buffer of the processing node;

loading weight values and the minibatch of input data into a tensor processing block of the processing node; and performing computations on the weight values and the minibatch of input data.

17. The non-transitory computer readable medium of claim 14, wherein the collective compute operation is an all-gather operation or an all-reduce operation.

18. An integrated circuit device comprising:

N number of processing nodes, wherein each processing node includes:

a shared memory accessible by each of the processing nodes;

a set of direct memory access (DMA) engines;

a state buffer; and a tensor processing block, wherein each of the processing nodes is operable to:

allocate an amount of space in the shared memory of the processing node for a collective compute operation operating on M number of sharded portions of parameters, wherein M is greater than N, and wherein the amount of space allocated in the shared memory corresponds to (M/N) number of sharded portions of parameters;

store a sharded portion of parameters associated with the processing node in the allocated space of the shared memory of the processing node;

obtain (M/N)−1 number of sharded portions of parameters from other integrated circuit devices to store (M/N) number of sharded portions of parameters in the allocated space of the shared memory of the processing node; and for each of the (M/N) number of sharded portions of parameters stored in the shared memory of the processing node, perform DMA accesses to multicast the sharded portion of parameters to a state buffer of each of the N number of processing nodes to provide each state buffer with the M number of sharded portions of parameters for the collective compute operation.

19. The integrated circuit device of claim 18, wherein each of the processing nodes is further operable to load the M number of sharded portions of parameters and a minibatch of input data into the tensor processing block of the processing node; and wherein the integrated circuit device is operable to perform computations on N number of minibatches of input data with the M number of sharded portions of parameters in parallel.

20. The integrated circuit device of claim 18, wherein the collective compute operation is an all-gather operation or an all-reduce operation.

* * * * *